United States Patent
Lindee et al.

(10) Patent No.: US 9,861,109 B2
(45) Date of Patent: Jan. 9, 2018

(54) PATTY-FORMING APPARATUS WITH BOTTOM FEED AND ROTARY PUMP

(71) Applicant: FORMAX, INC., Mokena, IL (US)

(72) Inventors: Scott A. Lindee, Mokena, IL (US); Paul Taylor, Munster, IN (US); Christopher Moore, Homer Glen, IL (US); E. William Wight, Roscoe, IL (US)

(73) Assignee: FORMAX, INC., Mokena, IL (US)

( * ) Notice: Subject to any disclaimer, the term of this patent is extended or adjusted under 35 U.S.C. 154(b) by 82 days.

(21) Appl. No.: 14/829,876

(22) Filed: Aug. 19, 2015

(65) Prior Publication Data

US 2015/0351418 A1    Dec. 10, 2015

Related U.S. Application Data

(63) Continuation of application No. 14/083,952, filed on Nov. 19, 2013, now Pat. No. 9,113,638, which is a continuation of application No. 13/187,453, filed on Jul. 20, 2011, now Pat. No. 8,613,615.

(60) Provisional application No. 61/366,057, filed on Jul. 20, 2010.

(51) Int. Cl.
  *A22C 7/00* (2006.01)
  *A23P 30/10* (2016.01)

(52) U.S. Cl.
  CPC .......... *A22C 7/0084* (2013.01); *A22C 7/0038* (2013.01); *A23P 30/10* (2016.08)

(58) Field of Classification Search
  CPC ..... A22C 7/0038; A22C 7/0084; A23P 1/105; A23P 30/10
  See application file for complete search history.

(56) References Cited

U.S. PATENT DOCUMENTS

| | | |
|---|---|---|
| 2,475,463 A | 7/1949 | Santo |
| 3,137,029 A | 6/1964 | De Zolt |
| 3,887,964 A | 6/1975 | Richards |
| 3,952,478 A | 4/1976 | Richard et al. |
| 4,043,002 A | 8/1977 | Brackman |
| 4,054,967 A | 10/1977 | Sandberg et al. |
| 4,065,241 A | 12/1977 | Orlowski |
| 4,182,003 A | 1/1980 | Lamartino et al. |
| 4,193,167 A | 3/1980 | Orlowski et al. |
| 4,302,868 A | 12/1981 | Wagner |
| 4,356,595 A | 11/1982 | Sandberg et al. |
| 4,372,008 A | 2/1983 | Sandberg |
| 4,516,291 A | 5/1985 | Goldberger et al. |
| 4,622,717 A | 11/1986 | Bollinger |
| 4,821,376 A | 4/1989 | Sandberg |
| 4,996,743 A | 3/1991 | Janssen |

(Continued)

*Primary Examiner* — James Mackey
(74) *Attorney, Agent, or Firm* — Klintworth & Rozenblat IP LLP

(57) ABSTRACT

The food product machine with a food supply, a rotary food pump connected to the food supply, a molding mechanism having a mold plate and a knockout drive, and a the mold plate configured to be driven to reciprocated between a fill and a discharge position. The knockout drive is reciprocating a knockout plunger to discharge molded food products from a cavity in the mold plate, the mold plate being reciprocated by a mold plate drive between a cavity fill position and a cavity discharge position. The machine further includes a manifold connected an outlet of the food pump and having an outlet passageway connected to an inlet of the molding mechanism for filling the cavity of the mold plate.

16 Claims, 19 Drawing Sheets

(56) References Cited

U.S. PATENT DOCUMENTS

| | | |
|---|---|---|
| 5,618,571 A | 4/1997 | London et al. |
| 6,254,911 B1 | 7/2001 | Komatsu |
| 6,416,314 B1 | 7/2002 | LaBruno |
| 7,021,922 B2 | 4/2006 | Azzar |
| 7,159,372 B2 | 1/2007 | Lindee et al. |
| 7,255,554 B2 | 8/2007 | Lamartino et al. |
| 7,416,753 B2 | 8/2008 | Lindee et al. |
| 7,521,077 B2 | 4/2009 | Azzar |
| 8,613,615 B2 | 12/2013 | Lindee et al. |
| 8,801,427 B2 | 8/2014 | Lindee et al. |
| 2008/0069707 A1 | 3/2008 | Van Norman et al. |
| 2008/0181997 A1 | 7/2008 | Cowart |

PATTY-FORMING APPARATUS WITH BOTTOM FEED AND ROTARY PUMP

This application is a continuation of co-pending U.S. patent application Ser. No. 14/083,952, filed Nov. 19, 2013, which is a continuation of U.S. patent application Ser. No. 13/187,453, filed Jul. 20, 2011, which claims the benefit of U.S. Provisional Application No. 61/366,057, filed Jul. 20, 2010, the entire contents of all of which are incorporated herein by reference.

BACKGROUND OF THE INVENTION

Increasing use of pre-processed foods, both in homes and in restaurants, has created a continuously growing demand for high-capacity automated food processing equipment. That demand is particularly evident with respect to hamburgers, molded steaks, fish cakes, and other molded food patties.

Food processors utilize high-speed molding machines, such as FORMAX® MAXUM700®, F-6™, F-12™, F-19™, F-26™, or F-400™ reciprocating mold plate forming machine, available from Formax, Inc. of Mokena, Ill., U.S.A., for supplying patties to the fast food industry. High-speed molding machines are also described for example in U.S. Pat. Nos. 3,887,964; 4,372,008; 4,356,595; 4,821,376; 4,996,743, and 7,255,554.

Although heretofore known FORMAX patty-molding machines have achieved commercial success and wide industry acceptance, the present inventors have recognized that needs exist for a forming machine having an even greater energy efficiency, an even greater durability; and an even greater duration of maintenance free operation. The present inventors have recognized that needs exist for an enhanced controllability and ability to tune a patty-forming machine for particular food materials to be processed, for an enhanced effectiveness of a patty-forming machine in producing uniform patties, for an even greater output rate of patties from a patty-forming machine, for an enhanced convenience for cleaning and maintenance of a patty-forming machine, and for a smoother and quieter patty-forming machine operation.

SUMMARY OF THE INVENTION

The food product forming machine of the invention provides an automated food product molding machine capable of producing uniform molded food products, such as food patties, at a high rate of production.

The food product machine has a food supply, a rotary food pump connected to the food supply, a molding mechanism having a mold plate and a knockout drive, the mold plate configured to be driven to reciprocate between a fill position and a discharge position. The knockout drive is for reciprocating a knockout plunger to discharge molded food products from a cavity in the mold plate, the mold plate being reciprocated by a mold plate drive between a cavity fill position and a cavity discharge position. The machine further includes a manifold connected an outlet of the food pump and having an outlet passageway connected to an inlet of the molding mechanism for filling the cavity of the mold plate.

In one embodiment, the food pump is a positive displacement pump. The pump has two rotors configured to create a vacuum between the inlet and the outlet when driven to rotate for drawing food product to the outlet.

In one embodiment, the rotary food pump has two rotors. Each rotor has at least two wings and each rotor has an area of rotation that overlaps with that of the other rotor. The pump has a drive shaft and a driven shaft, the drive shaft has a drive gear at a first end and one of the rotors at the second end, the driven shaft has a driven gear at a first end and the other of the rotors at the second end; the drive and driven gears are meshed to operate the rotors in sync.

The machine has a pump motor connected to a drive shaft of the rotary pump. The pump motor is a servo rotary actuator.

In one embodiment, the machine has a hopper for holding a supply of food product, and an auger system configured to force food product through an outlet of the hopper. The auger system has one feed screw configured to move food product longitudinally forward in the hopper toward the outlet.

The feed screw is located in the hopper connected to a feed screw drive configured to rotate the feed screw. The feed screw is located at the bottom of the hopper. The feed screw is positioned horizontally in the bottom of the hopper and is configured to rotate and drive food product toward the front of the hopper.

The hopper has an outlet at the front of the hopper. The outlet extends from the floor of the hopper upward at the front of the hopper.

In one embodiment, the outlet that extends forward of the main hopper body encloses a forward portion of the feed screw. The outlet has a connecting section connected to the main hopper body, and a narrowing section opposite the connecting section.

In one embodiment, the hopper has an opening at the lower rear of the hopper configured to remove the feed screw therethrough for maintenance, and a cap for removably covering the opening; the feed screw journaled to rotate in an opening of the cap.

In one embodiment, the feed screw drive is located outside of the hopper and is axially aligned and connected with a shaft of the feedscrew. The feed screw is longitudinally orientated at the bottom of the hopper.

In one embodiment, the auger system has a plurality of feed screws located in the hopper. The feed screws are located adjacent to each other and adjacent to the floor of the hopper.

Numerous other advantages and features of the present invention will be become readily apparent from the following detailed description of the invention and the embodiments thereof, from the claims and from the accompanying drawings.

DETAILED DESCRIPTION

Figure 1:
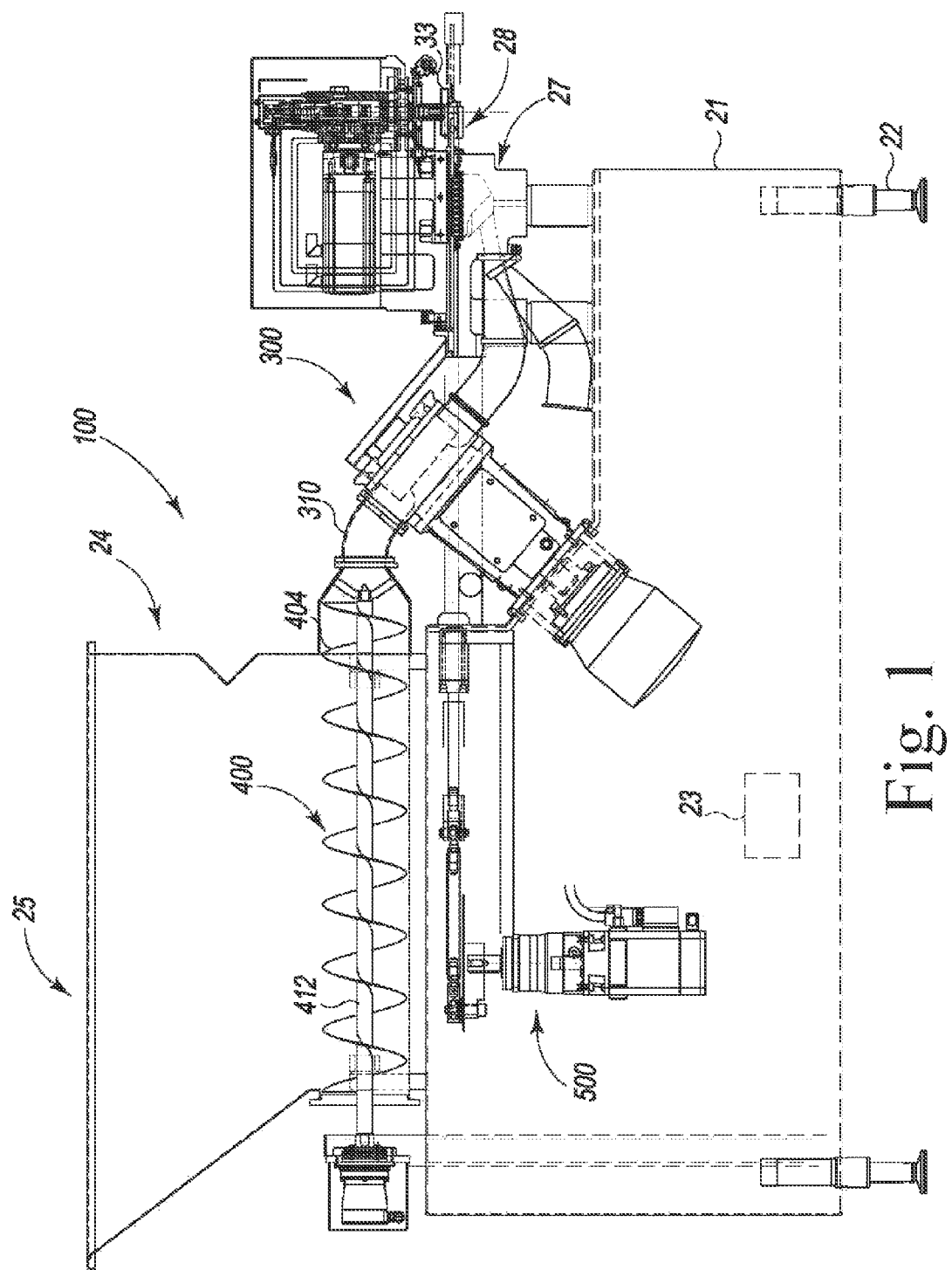
FIG. 1 is a side view of the food product forming machine of the invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Machine Overview

The food product forming machine or food patty molding machine 100 is illustrated in FIGS. 1-13. The molding machine 100 includes a machine base 21, optionally mounted upon a plurality of feet 22, rollers or wheels. The machine base 21 supports the operating mechanism for machine 100 and contains electrical actuating systems, and most of the machine controls. The machine 100 includes a food supply system 24 for supplying moldable food material, such as ground beef, fish, or the like, to the processing mechanisms of the machine. A control panel, such as a touch screen control panel 601, is arranged on a forward end of the machine 100.

As generally illustrated in FIGS. 1-8, the food supply system includes an auger system 400 and a hopper 25 that opens into the intake of a food pump system 300. The food pump system 300 includes at least one food pump, described in detail hereinafter, that continuously, or intermittently under a pre-selected control scheme controlled by a machine control 23, pump food, under pressure, into a manifold 27 flow-connected to a cyclically operated molding mechanism 28. Generally during operation of the machine 100, the pump is forcing food material under pressure into the intake of manifold 27. The operation of the machine is controlled by the machine control 23.

In the operation of machine 100, a supply of ground beef or other moldable food material is deposited into hopper 25 from overhead. An automated refill device (not shown) can be used to refill the hopper when the supply of food product therein is depleted. At the bottom of the hopper 25 is the auger system 400 for moving the food material longitudinally along the hopper 25 to the inlet 301 of the food pump system 300.

The manifold 27 comprises a system for feeding the food material, still under relatively high pressure, into the molding mechanism 28. Molding mechanism 28 operates on a cyclic basis, first sliding a multi-cavity mold plate 32 into a receiving position over manifold 27 and then away from the manifold to a discharge position aligned with a series of knock out cups 33. When the mold plate 32 is at its discharge position, knock out cups 33 are driven downwardly, discharging hamburgers or other molded patties from machine 100, as indicated by direction A in FIG. 2. The molded patties are deposited onto a conveyor (not shown) that is positioned under the knockout cups 33, to be transported away from the machine 100.

Food Supply System

The food supply system 24 includes the hopper and the auger system 400, as shown in FIGS. 1-8. The auger system 400 is located at the bottom of the hopper 25. The auger system includes two feed screws 402, 404, and two feed screw drive motors 406, 408. The feed screws 402, 404 each have a center shaft 410, 412. The center shaft is journaled in and supported by front and rear feed screw supports 414, 422. The feed screw supports extend vertically from and attach to the machine base 21. The feed screws are located adjacent to one another and extend longitudinally along the bottom of the hopper. The center shafts are parallel to the bottom 527 of the hopper.

Figure 5:
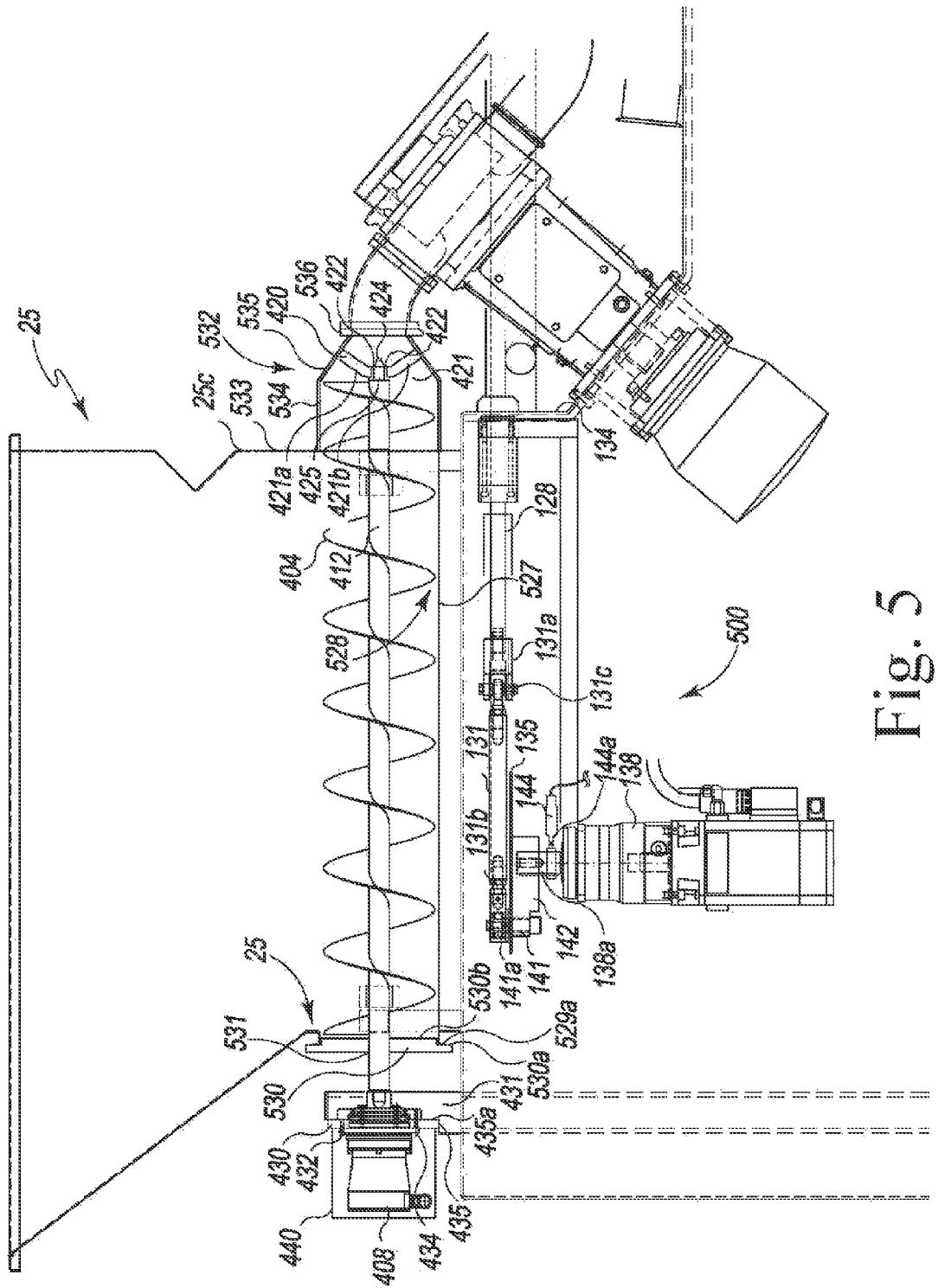
FIG. 5 is a partial side view of the food supply system and a mold plate drive system of the forming machine.

As shown in FIG. 5, the rear 25c of the hopper has an opening that is covered by a cap 530. The cap 530 has holes 531 that the feed screw shafts are journaled to rotate therein on bearings. The shafts extend through the cap to connect to the motors 406, 408. The rear opening of the hopper has a vertical lip 529a. The back of the cap has a recessed portion 530a that mates with the lip 529a. The cap also has a non-recessed portion 530b that fits into the rear opening.

Figure 3:
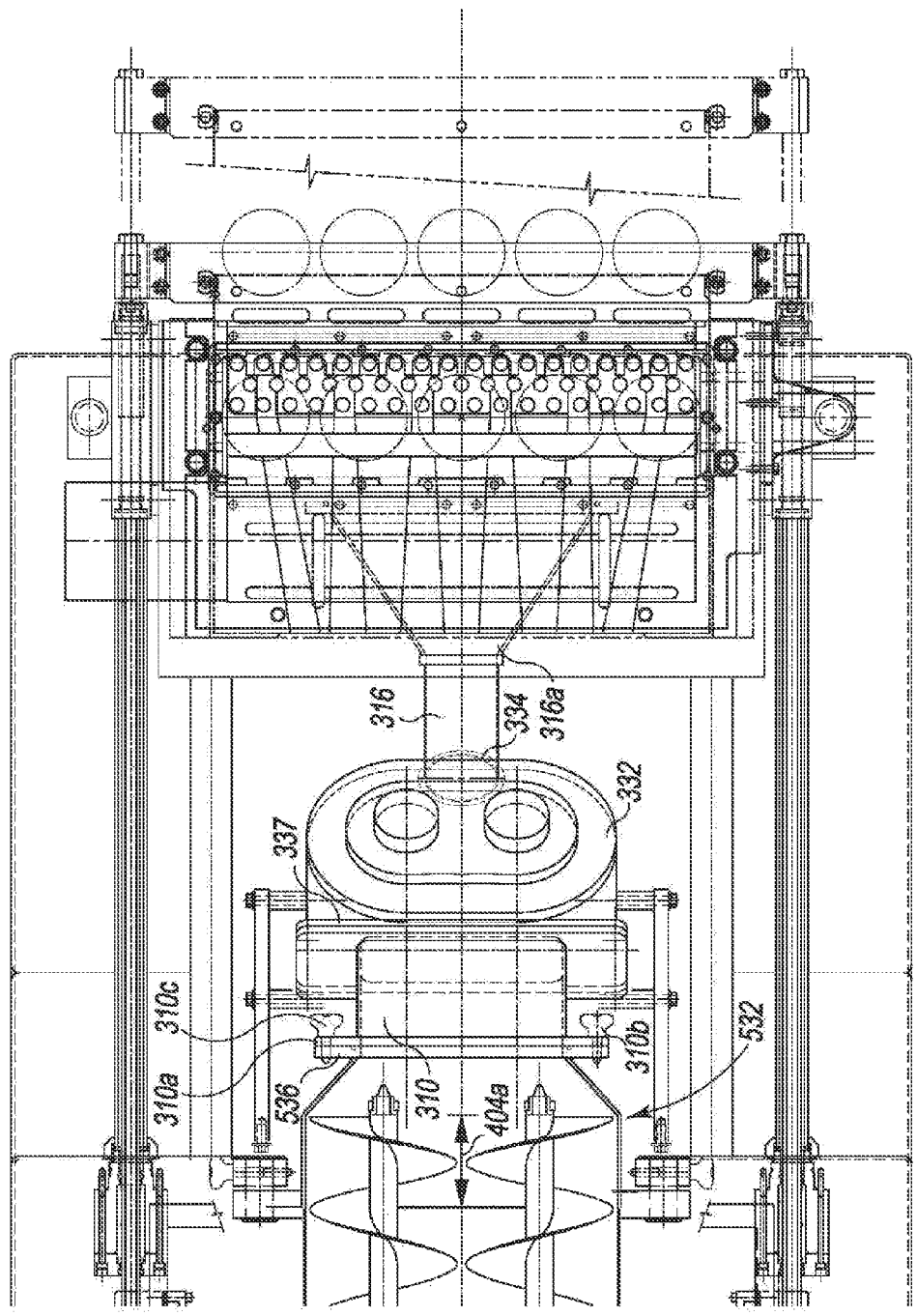
FIG. 3 is a partial top view of a portion of the food supply system, the rotor pump and the molding mechanism of the forming machine shown in FIG. 1.

A hopper outlet 532 is formed to or attached to the front 533 of the hopper 25. A portion of the outlet opening is aligned with the bottom floor 527 of the hopper and the opening extends upwardly from the floor 527. The outlet extend forward of the main hopper body 25c as shown in FIG. 5. The outlet has a connecting section 534 and a narrowing section 535 that narrows to an outlet flange 536 toward the food pump system 300. The outlet has a width that is greater than its height. Upper and lower feed screw supports 420, 421 extend from the conical section 535 to a bearing head 422. The supports 420, 421 are perpendicular to the conical section 535 inside surface and extend therefrom to an elbow 421a, 421b and bearing sleeves 422. The front of the shafts 412, 410 have a recessed portion 425 that terminates in a conically reducing point end 424. The point end 424 extends beyond the bearing sleeves 422. The shafts 410, 412 are journaled to rotate at the front on the recessed portion 425 in the bearing sleeves. As shown in FIG. 3, a front portion 404a of each feed screws is enclosed by the outlet and extend beyond the main hopper body 25c.

Figure 6:
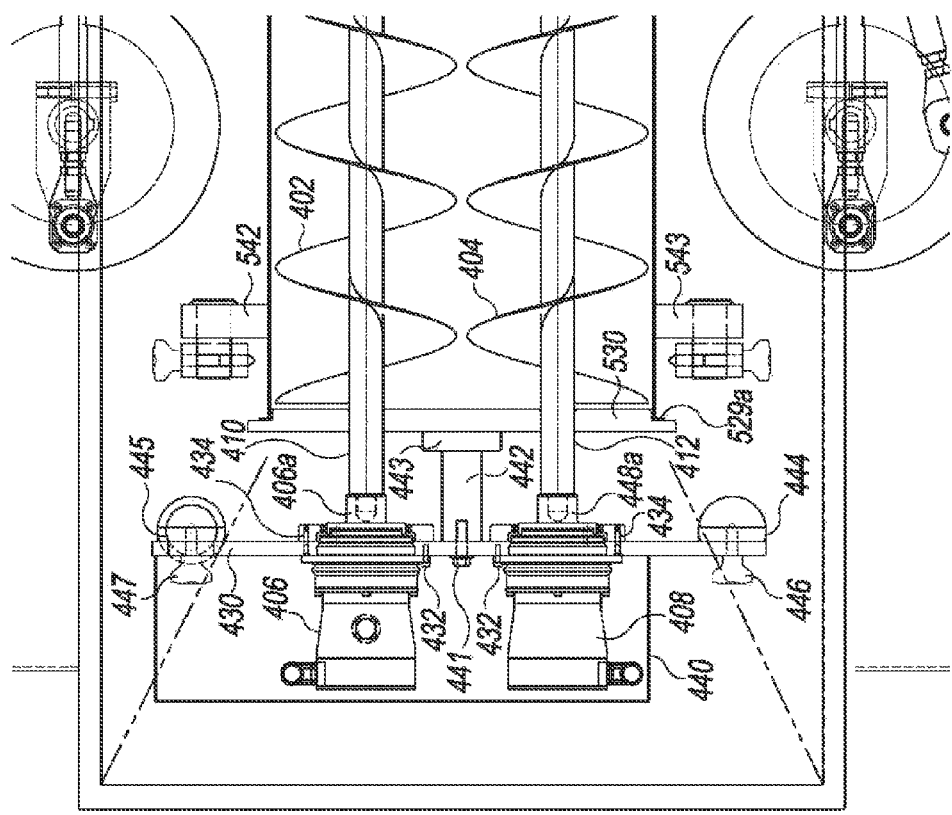
FIG. 6 is a partial top view of a portion of the hopper and feed screw drive of the forming machine.

As shown in detail in FIGS. 5 and 6, the feed screw drive motors 406, 408 are mounted to a feed screw drive motor support plate 430 by screws, studs, or bolts 432. The support plate 430 is attached to a support mount 431 by screws or bolts 434. The support mount 431 is attached to vertical support members 444, 445 by fasteners 446, 447 respectively. The vertical support members 444, 445 extends vertically from the machine base 21 and is supported thereon. The support mount 431 has a ledge 435 defining a recessed area 435a. The support plate is located in the recessed area 435a and on the ledge 435. The drive motors, 406, 408 are enclosed by a drive motor housing 440. The drive motor housing 440 is attached to the support plate 430.

The motors 406, 408 are axially aligned with the corresponding feed screws 402, 404 respectively. Output shafts 406a, 408a are coaxial with the corresponding feed screw shafts 410, 412 respectively. The supports hold the feed screw slightly above the bottom 527 surface of the hopper 25 to form a gap 528 between the feed screw and the bottom.

A cap retaining brace 442 is attached by a bolt 441 to the support plate 430 and extends forward to contact the cap 530 by a wide member base 443 to hold the cap engaged with the hopper 25.

The feed screws 402, 404 are removable from the hopper for service and cleaning. To remove the feed screws 402, 404, the support plate 430 and the support mount 431 disconnected from the vertical support members 444, 445 via the fasteners 446, 447. The support mount 431 is moved longitudinally rearward and the recessed portions 425 of the feed screw shaft are withdrawn from the bearing sleeves 422 at the front and the feed screws are withdrawn rearward from the hopper.

Hopper

Figure 7:
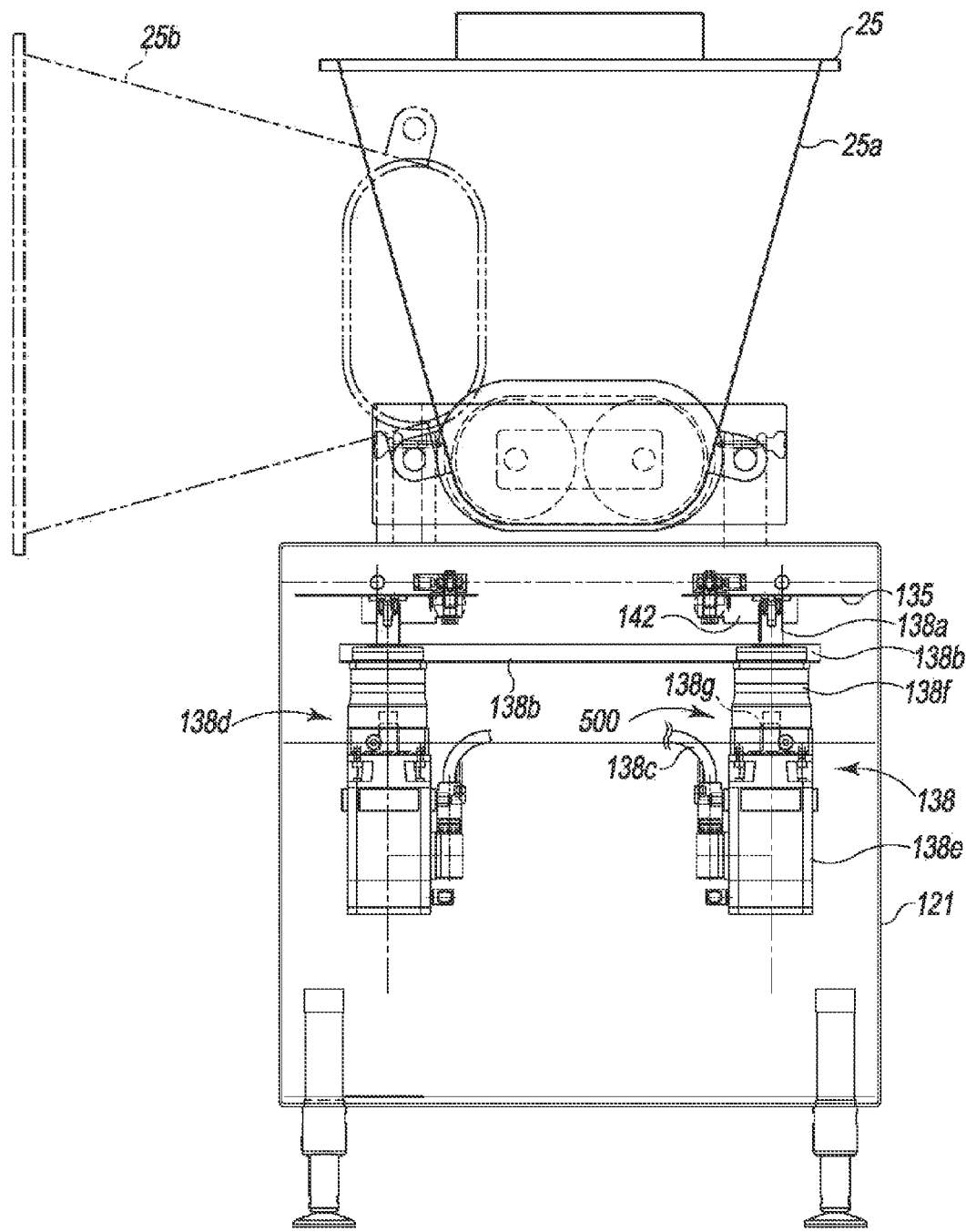
FIG. 7 is a rear view of the forming machine of FIG. 1.

The hopper is shown in FIGS. 1, 4, 5, 7, and 8. As shown in FIG. 7, the hopper 25 has a working position 25a and a service position 25b. When the hopper is in the service position it is tilted 90 degrees to the right or left side to permit a person to more easily clean or service the hopper.

Figure 8:
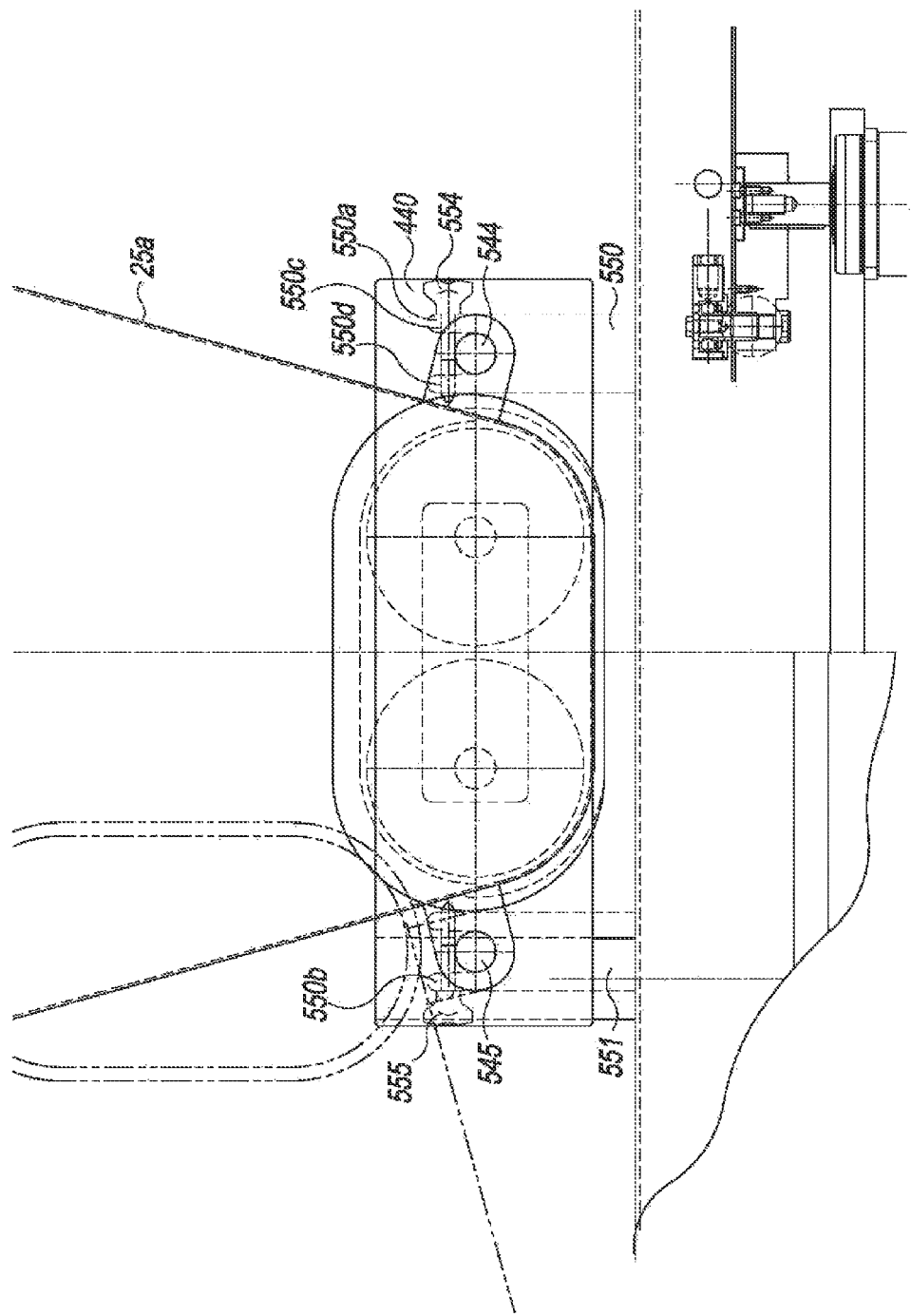
FIG. 8 a partial rear view of the forming machine taken from FIG. 7.

As shown in FIG. 4A, the hopper 25 has front and rear pairs of mounting arms 540, 541, 542, 543. Each mounting arm has a horizontal support pin 544, 545, 546, and 547. The front mounting pins extend forwardly from the front mounting arms 540, 541 and the rear mounting pins extend rearward from the rear mounting arms 542, 543. The pins engage a hopper support 550, 551, 552, 553. Each hopper support, as best shown in FIG. 8, has a U-shaped end 550a, 550b (not labeled for front hopper supports). The outer end of each pin lies in the U-shaped channel of the U-shaped end. Each U-shaped end has a part of co-linear holes 550c, 550d (labeled only for support 150) penetrating an upper portion of the U-shaped end. The co-linear holes are located above the area that the pin would occupy in the U-shaped channel. Retaining pins are removably placed through the co-linear holes when the support pin is in the U-shaped channel to secure the hopper to the hopper supports.

To move the hopper from the working position to the service position, each of the retaining pins on one lateral side of the machine are removed and the hopper is tilted to the service position in the direction opposite of the lateral side where the retaining pins were removed. The hopper pivots toward the side were the retaining pins remain in place and the hopper pivots on the support pins. Likewise to move the hopper to the working position from the service position, the hopper is tilted toward the side of the machine where the retaining pins were removed, until the support pins on that side engage the U-shaped supports. Then the retaining pins are secured through the co-linear holes to secure the hopper in the working position.

Food Pump System

The food pump system 300 of the machine 100 is shown in FIGS. 1, 2, 3, 4, and 14A-17. The pump system 300 comprises a rotary pump 330, a pump motor 350, a mounting bracket 302, a pump intake passage 310, and a pump output passage 316.

The outlet flange 536 of the hopper outlet 532 connects to a first flange 310a of the pump intake passage 310. A gasket may be provided between the outlet flange 536 and the first flange 310a to seal the connection therebetween. The intake passage 310 has a second flange 310b at an end opposite the first flange 310a. The second flange 310b connects to the pump intake flange 337 which surrounding the intake opening 334 of the food pump 330. A gasket 336 may be provided between the outlet flange 536 and the first flange 310a to seal the connection therebetween. The intake flange is located at a vertical position that is higher than the vertical position of the mold plate and manifold 27.

The pump 300 is mounted and supported by an upper brace 302 and an angled wall 501 of the machine base 21. The machine base 21 has a vertical wall 503 connecting to the angled wall 501 that angles downward and toward the molding mechanism 28. The angled wall connects to a lower horizontal wall 502. In one embodiment, the pump is mounted and orientated in a plane that is substantially parallel or co-planar to the angled wall 501. The pump has an inlet that is located above the mold plate and the manifold 27. The pump has an outlet that is located below the mold plate and the manifold 27. The pump may be angled on a slant between the location of the inlet and the location of the outlet.

The rotary pump is shown in detail in FIGS. 14A-16. In one embodiment, the pump rotary pump is a Universal I Series Positive Displacement Rotary Pump, model number 224-UI with a rectangular outlet flange manufactured by Waukesha Cherry-Burrell, with a place of business in Delavan, Wis., and affiliated with SPX Flow Technology. A positive displacement pump causes a food material to move by trapping a fixed amount of it then forcing that trapped volume into the discharge opening or pipe.

Figure 15:
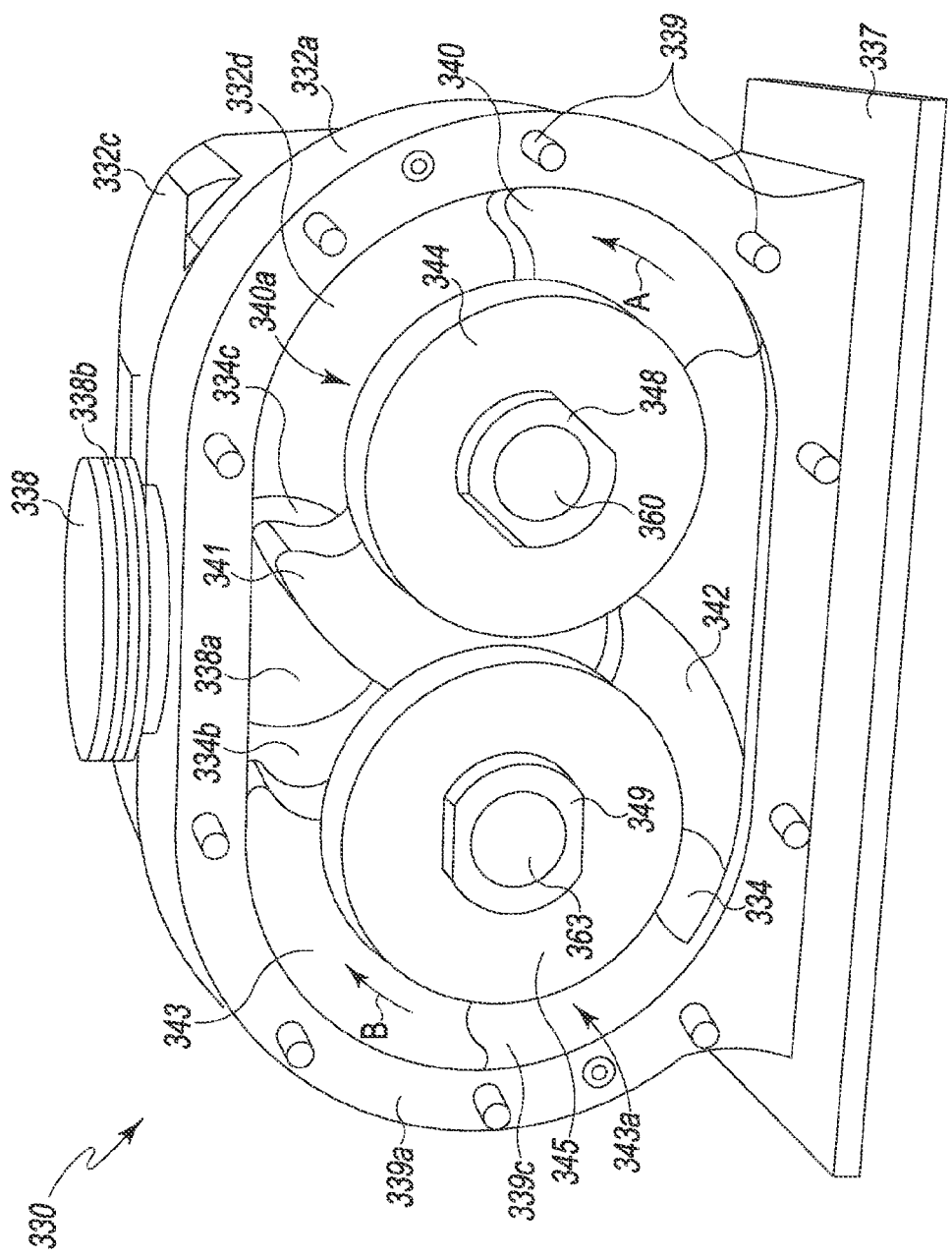
FIG. 15 is a top side view of the rotary pump with the face plate removed.
Figure 16:
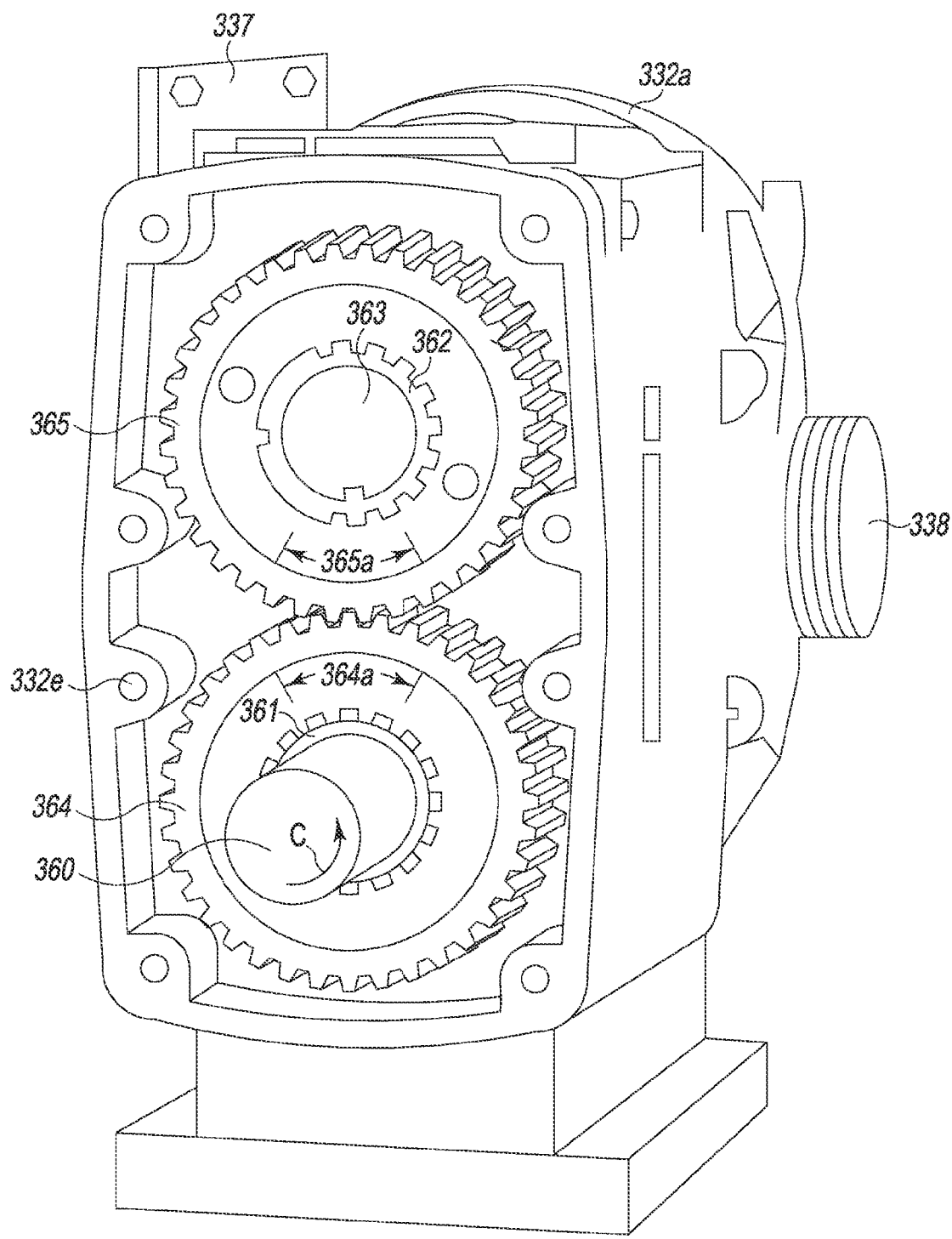
FIG. 16 is a bottom side view of the rotary pump with the back plate removed.

As shown in FIG. 15, the pump 330 has a housing with a pump area 332a and a gear area 332c. The pump has an inlet 334 and an outlet 338 in communication with the pump area 332a. The pump area is separated from the gear area by a wall 332d. A portion of the gear area is shown in FIG. 16 were the back cover plate is removed. A drive gear 364 and a driven gear 365 are meshed across a meshed arch of each gear 356a, 364a. The drive gear is keyed to rotate in sync with the drive shaft 360 at a first end of the drive shaft. The drive gear has a locking nut and lock washer 361 that assists in securing the gear to the drive shaft. The driven gear is keyed to rotate the driven shaft 363. The driven shaft has a locking nut and lock washer 361 that assists in securing the gear to the driven shaft at a first end of the drive shaft. The driven and drive shafts are journaled through a support structure (not shown) in the housing to carry rotors 340a, 343a at second ends of the driven and drive shafts opposite the first ends. The support structure (not shown) in the housing contains high capacity, double tapered roller bearings that the drive and driven shafts rotate on. The rear cover plate (not shown) contains an opening to allow the drive shaft to extend outside of the housing to engage a drive source such as the motor 350.

Figure 14A:
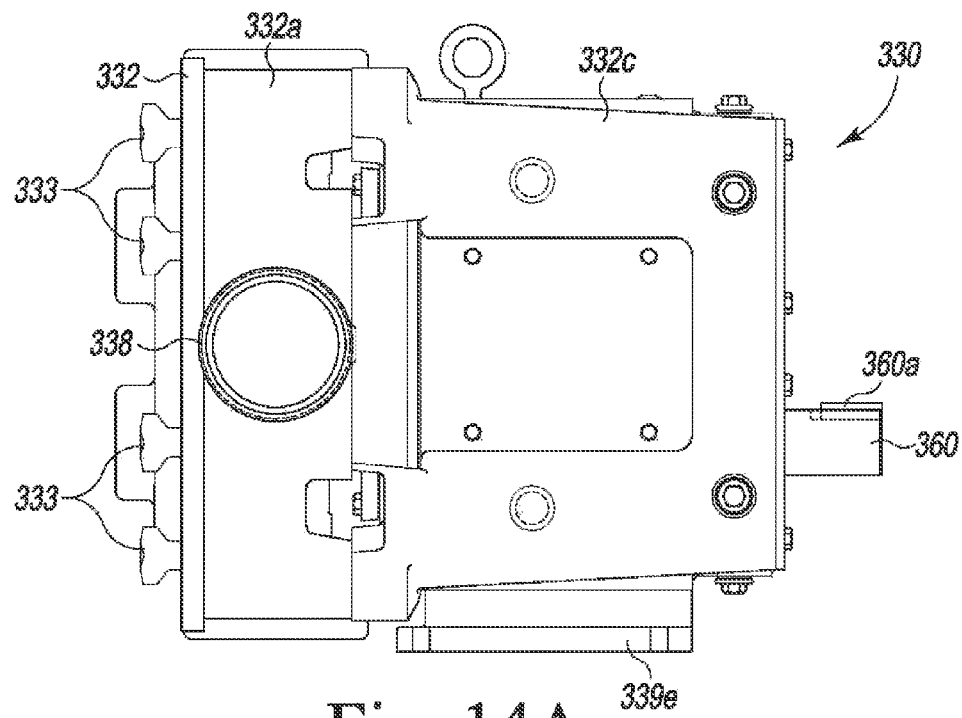
FIG. 14A is an inlet side view of the rotary food pump.
Figure 14B:
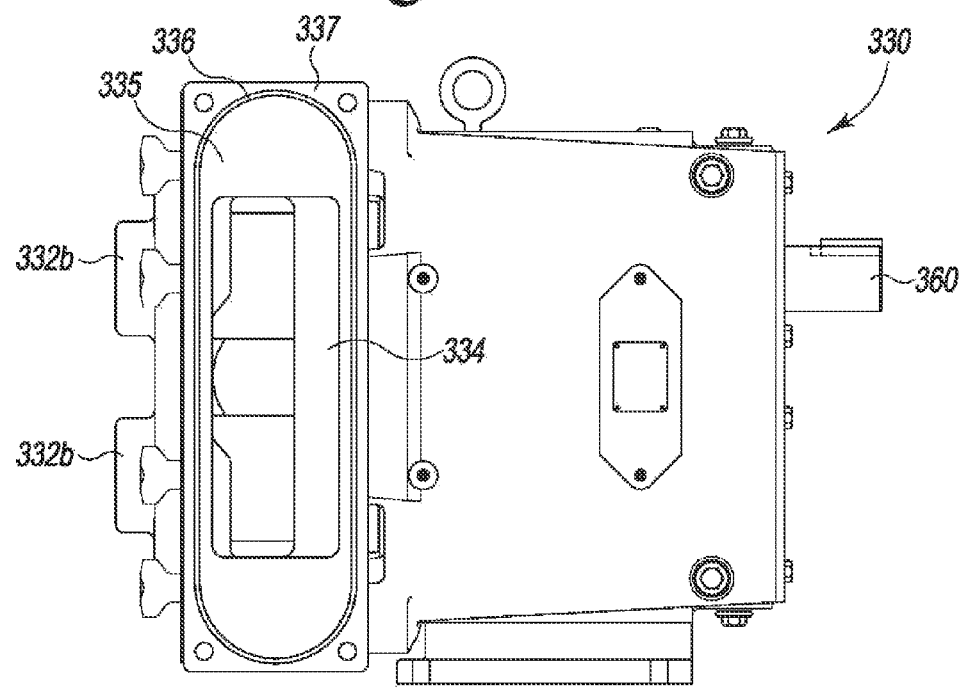
FIG. 14B is an outlet side view of the rotary food pump.
Figure 14C:
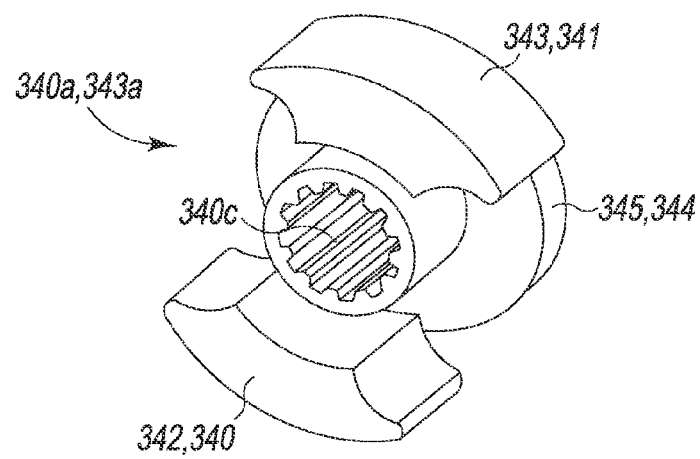
FIG. 14C is a perspective view of a rotor from the rotary food pump.
Figure 14D:
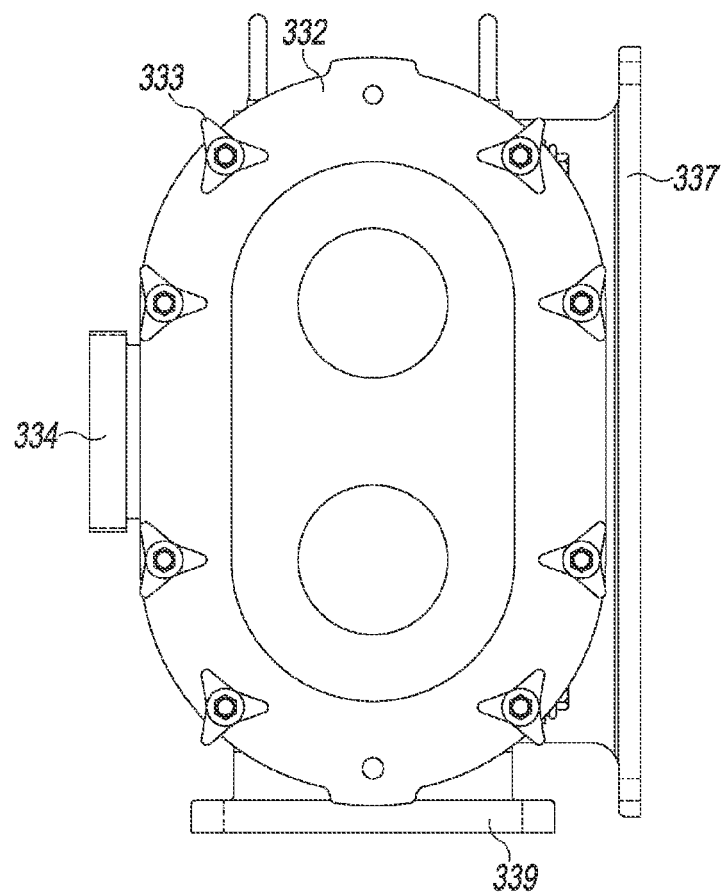
FIG. 14D is a top side view of the rotary food pump.
Figure 14E:
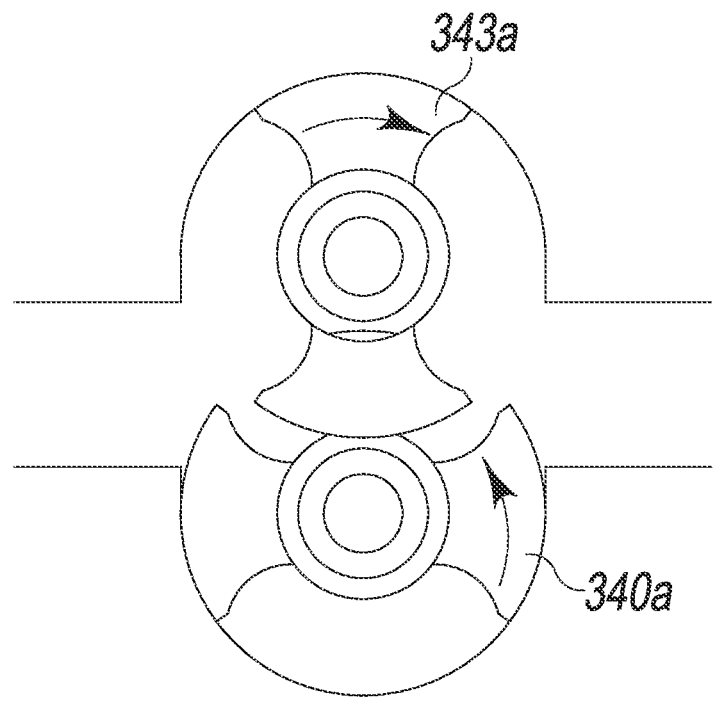
FIG. 14E is a schematic diagram of a portion of the rotary pump.
Figure 14F:
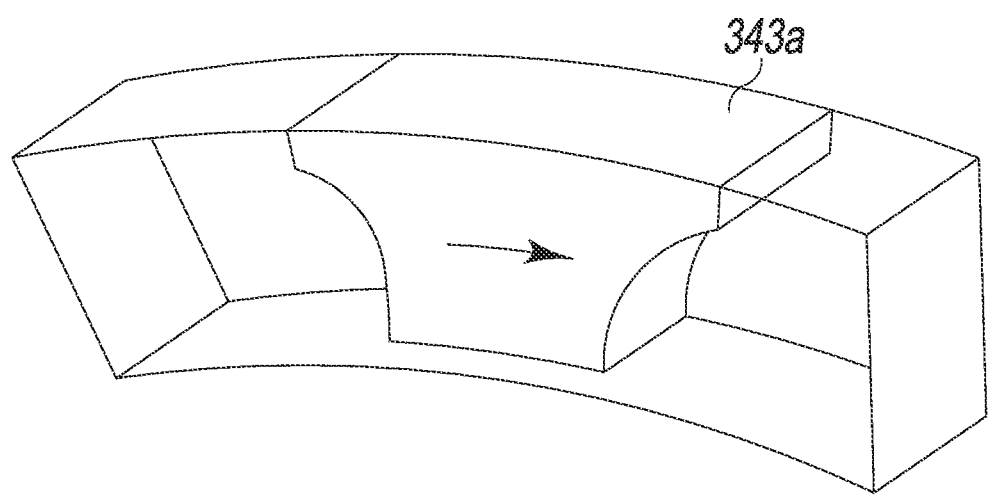
FIG. 14F is a wing of the rotor within an within an portion of it area of operation.

The second ends of the drive and driven shafts have a splined section (not shown). The rotors 340a 343a have a splined opening that mates with the splined section of the drive and driven shafts respectively. Each rotor 340a, 343a has two wings 340, 341 and 342, 343, respectively. The wings have overlapping areas of rotation as shown in FIG. 14E. Each wing is located opposite the other wing on the rotor and gaps are located between the wings about the circumference of the rotor. The wings travel in annular-shaped cylinders 339c (not labeled for rotor 340a) machined into the pump body. The rotor is placed on the shaft with a plate portion 344, 345 outwardly facing. Nuts 348, 349 are screwed on a threaded end portion of the shafts to secure the rotor in place. The rotors have a close fit clearance between the outer surface of the wing 343a and the corresponding cylinder wall faces 339c of the pump area. As shown in FIG.

14E, the wing of one rotor will be located in the open area of the other rotor during a portion of an operation cycle. An operation cycle comprises a full 360 degree rotation of a rotor.

The splined mating of the rotors and shafts ensure that the rotors rotate in sync with the respective drive and driven shafts. The rotors are interference fitted in the pump area as shown by their overlapping areas of rotation. The gearing 356a, 364a prevents the rotors from contacting each other during operation.

When the drive shaft 360 is rotated in direction C shown in FIG. 16, the drive shaft rotate the first rotor in the same direction, direction A in FIG. 15. Simultaneously, as provided by the meshed gearing 364, 365 the second rotor is rotated in the opposite direction, as shown by direction B in FIG. 15, of that of the first rotor.

The vacuum created by the rotation of the rotors 340a, 343a captures and draws food product in to an inlet 334, through the pump and the outlet passage 338a, and out the outlet 338. The outlet may have threads 338b on the outside of the outlet as shown in FIG. 15.

The pump area 332a face 339a is covered to enclose the pump area by a face plate 332. The face plate has raised areas 332b for accommodating space required for the shaft ends and the corresponding nuts 348, 349. The face has a plurality of holes corresponding to the studs 339 that extend from the face 339a. Face plate wing nuts 333 secure the face plate to the face 339a.

The outlet 338 is a circular outlet and the inlet 334 is an oblong with a rectangular flange 337. The rectangular flange 337 has an oval seal or gasket 336 surrounding the oblong inlet.

The outlet 338 connects pump output passage 316. The output passage 316 includes an expanding-V section 316a that connects with the manifold inlet passage 111. The output passage 316 connected to the manifold 27 with a lower hinge 318. When the output passage is connected to the rotary pump 330 and the output passage is in the deployed position, a flange 317 of the output passage is flush with the face 319 of the manifold at the inlet passage 111. When the output passage is disconnected from the rotary pump and in a lowered position 326, the flange and output passage pivots downward and away from the inlet passage about the lower hinge 318.

Figure 17:
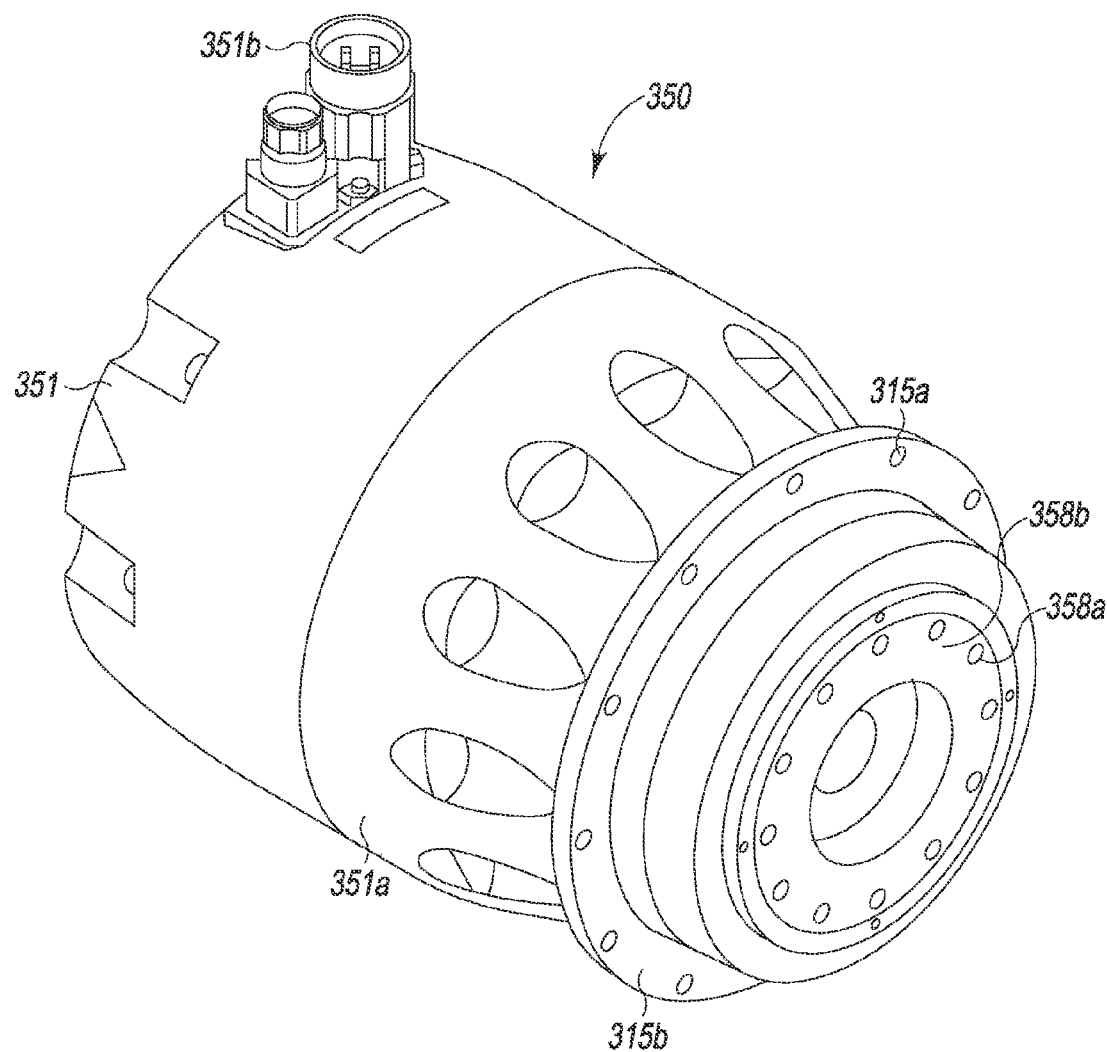
FIG. 17 is a perspective view of a rotary pump motor.

The pump 330 is driven by the pump motor 350. The motor is shown in FIG. 17. In one embodiment, the motor 350 is a servo rotary actuator, such as the TPM+ Power 110 Stage 2 series rotary actuator with brake manufactured by Wittenstein, Inc. with a place of business in Bartlett, Ill. In one embodiment motor 350 is an electric servo rotary actuator, such as the model TPMP110S manufactured by Wittenstein, Inc. The servo rotary actuator comprises a combined servo motor and gearbox assembly in one unit. The servo rotary actuator has a high-torque synchronous servo motor. The configuration of the servo motor and the gearbox gearing provides the actuator with a reduced length. The actuator has a helical-toothed precision planetary gearbox/gearhead for reduced noise and quiet operation. The rotary actuator has a 70:1 gearing ratio, 1180 ft./lbs. of torque, and maximum speed of 65 RPMs.

Figure 2:
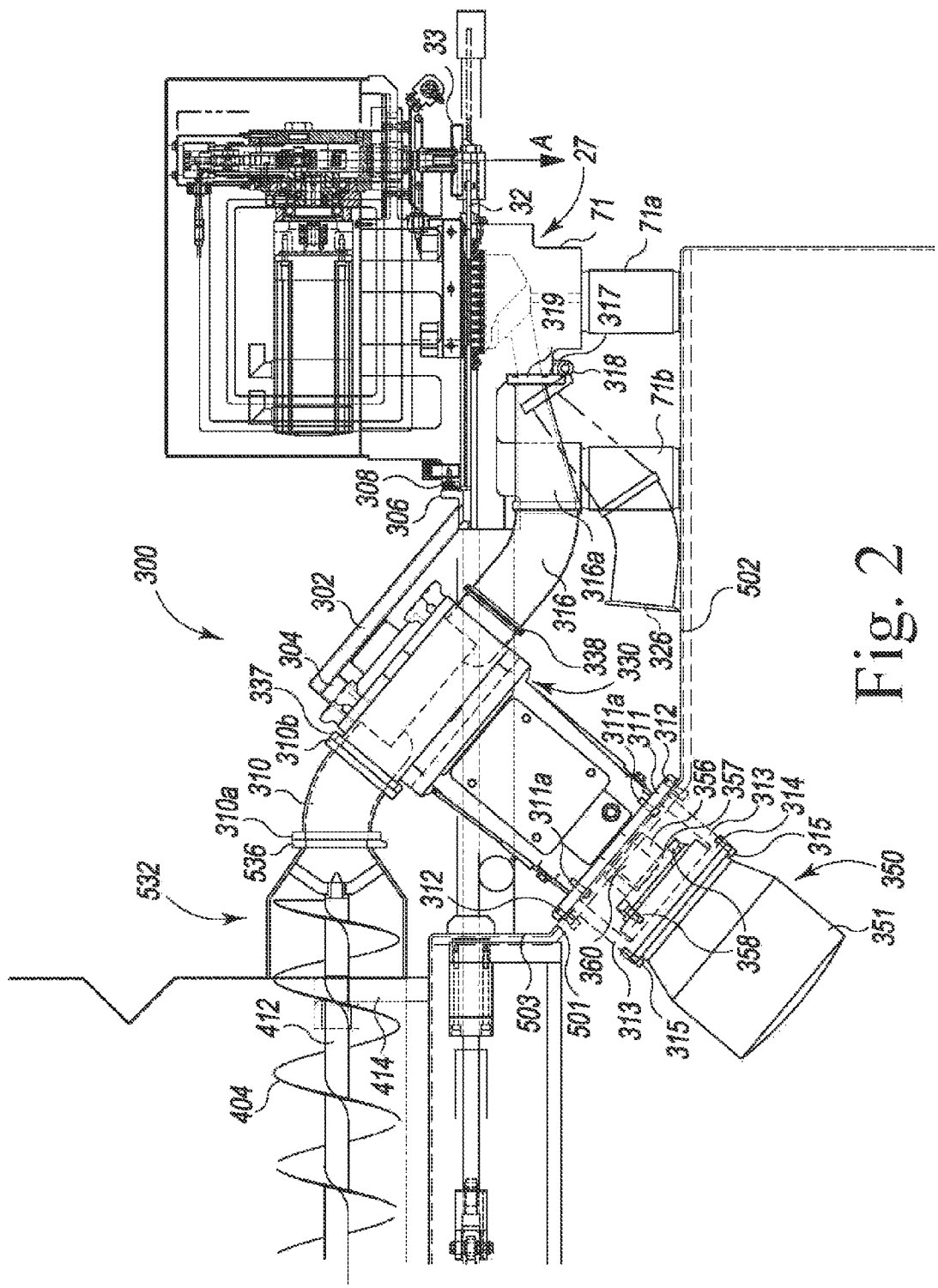
FIG. 2 is an enlarged partial side view a rotary pump and molding mechanism of the food product forming machine taken from FIG. 1.

The motor 350 has a housing 351, an electrical connection 351b, a mounting face 315b, and an output coupling flange 358b. The mounting face 315b has a plurality of holes 315a. As shown in FIG. 2, the pump is secured to a mounting plate by a plurality of bolts 311a which engaged the back of the pump, such as by engaging threaded holes 332e at the back of the pump. The mounting plate is secured to the machine base 22 by bolts 312. A circular mounting member 313 encloses the connection between the motor and the pump and attaches to the mounting plate 311. Alternatively, the mounting member 313 may connect directly to the machine base. The mounting member 313 connects to the motor 350 at the mounting face. A number of bolts 315 secure the motor to the mounting member. A circular coupling 356 is attached to the output coupling flange 358b by bolts 358 threaded into the correspondingly threaded holes 358a of the output coupling flange 358b. At an opposite end, the coupling 356 receives the drive shaft 360 in an opening of the coupling 356. The drive shaft has a key 360a that engages a corresponding slot of the opening of the coupling 356 to lock the machine 100 to the drive shaft of the pump. The motor is angled to align with the output shaft of the pump.

In one embodiment, a fill plunger system is disposed downstream of the pump to increase the pressure of the food mass within the manifold prior to, or simultaneously with, the filling of the mold cavities. The fill plunger system can be one similar to the fill plunger system described in U.S. Ser. No. 13/187,448, filed on Jul. 20, 2011, and herein incorporated by reference to the extent not inconsistent with the present disclosure.

Molding Mechanism

As shown in FIGS. 1-4 and 9-12, the upper surface of the housing 71 that encloses the manifold 27 carries a support plate or wear plate 121 and a fill plate 121a that forms a flat, smooth mold plate support surface. The manifold is supported by four support columns 71a, 71b. The support columns are connected to the machine base 21. The mold support plate 121 and the fill plate 121a may be fabricated as two plates as shown or a single plate bolted to or otherwise fixedly mounted upon housing 71. The fill plate 121a includes apertures or slots 121b that form the upper portion of the manifold inlet passage 111. In the apparatus illustrated, a multi fill orifice type fill plate 121a is utilized. A simple slotted fill plate is also encompassed by the invention.

Mold plate 32 is supported upon plates 121, 121a. Mold plate 32 includes a plurality of individual mold cavities 126 extending across the width of the mold plate and alignable with the manifold outlet passageway 111c. The mold plate may have a single row of cavities or may have plural rows of cavities, stacked in aligned columns or in staggered columns. A breather plate or cover plate 122 is disposed immediately above mold plate 32, closing off the top of each of the mold cavities 126. A mold cover casting or housing 123 is mounted upon cover plate 122. The spacing between cover plate 122 and support plate 121 is maintained equal to the thickness of mold plate 32 by support spacers (not shown) mounted upon support plate 121. Cover plate 122 rests upon spacers 124 when the molding mechanism is assembled for operation. Cover plate 122 and mold cover casting 123 are held in place by four mounting bolts, or nuts tightened on studs 125.

The cover plate 122 can be configured as a breather plate as part of a molding mechanism air-and-fines removal system, such as described in U.S. Pat. No. 6,416,314, U.S. Pat. No. 7,416,753, or U.S. Ser. No. 10/942,755, filed on Sep. 16, 2004, each of which are herein incorporated by reference. In one embodiment, the breather plate 122 provides breather holes 216 and an associated air channel 122 flow connected to the breather holes for allowing the expulsion of air during filling of the mold cavities 126. The breather holes 216 are minute air outlet holes formed in the breather plate, in the part of the breather plate adjacent fill slots 121b. As the food product is pumped into mold cavities 126, it displaces the air in the mold cavities. The air is forced outwardly through the apertures 216 and the air channel 122 and an upwardly extending channel 122c. Any food particles small enough to pass through the apertures 216 follow this same path back into the food product hopper. The air channel 122 is connected to an upward air channel 122c that may be connected to the hopper by a suitable conduit, such as a pipe (not shown) to recycle food product that might be expelled with the air into the air channel. Alternatively the air channel may be connected to the intake of the pump 330. The pump may have a low pressure on the intake side which create vacuum to draw air through from the cavity and through the air channel 122, 122c.

Figure 4:
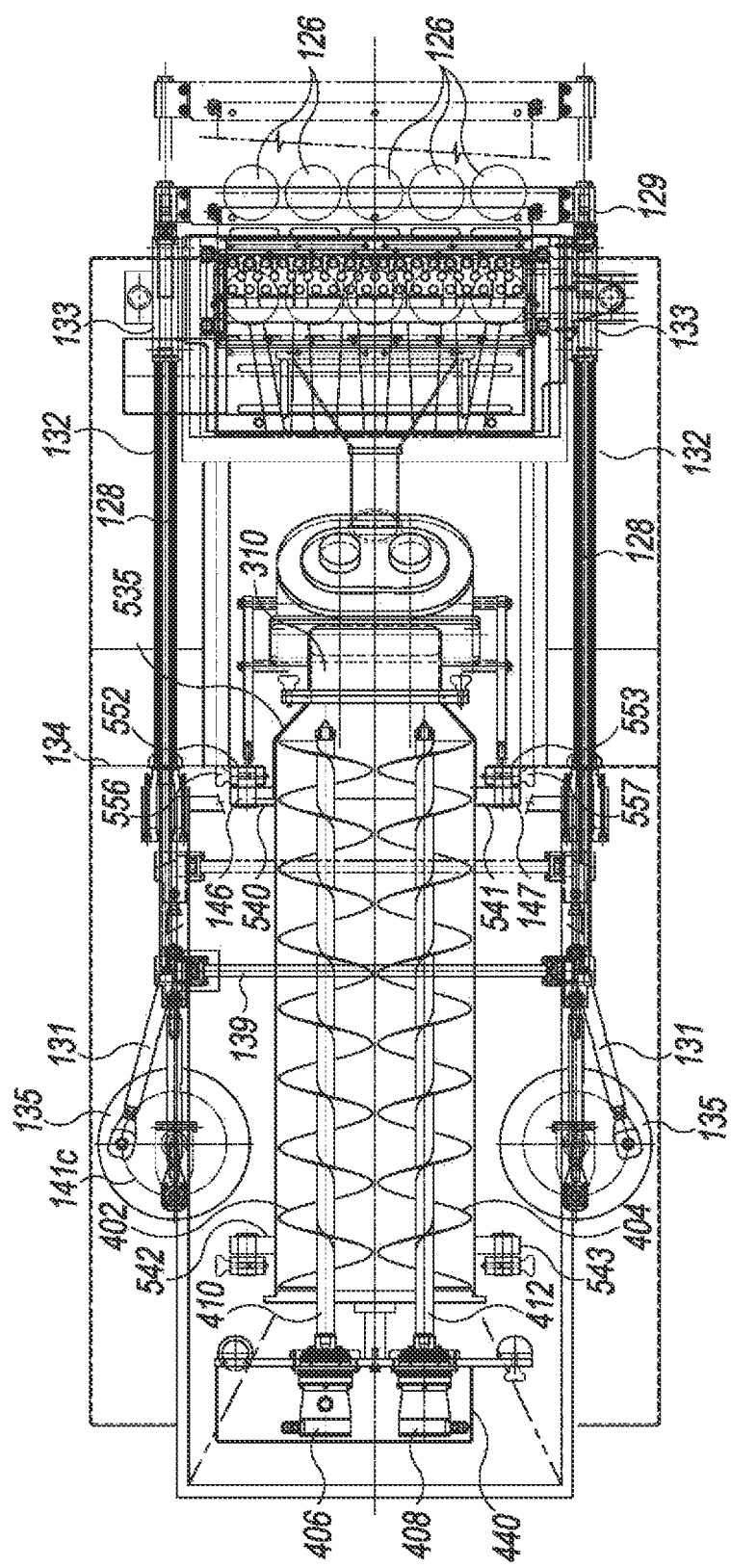
FIG. 4 is a top view of the forming machine of FIG. 1.

As best illustrated in FIGS. 4 and 5, mold plate 32 is connected to drive rods 128 that extend alongside housing 71 and are connected at one end to a transverse bar 129. The mold plate drive system 500 comprises the drive rods 128, the mold plate drive motors 138, 138d and the associated linkages. The other end of each drive rod 128 is pivotally connected to a connecting link 131 via a machine 100 plate 131a and a pivot connection 131c, shown in FIG. 5. The pivot connection 131c can include a bearing (not visible in the figures) surrounding a pin within an apertured end of the connecting link 131. The pin includes a cap, or carries a threaded nut, on each opposite end to secure the crank arm to the machine 100 plate 131a.

Each drive rod 128 is carried within a guide tube 132 that is fixed between a wall 134 and a front bearing housing 133. The connecting links 131 are each pivotally connected to a crank arm 142 via a pin 141 that is journaled by a bearing 141a that is fit within an end portion of the connecting link 131. The pin crank arm 142 is fixed to, and rotates with, a circular horizontal guard plate 135. The pin 141 has a cap, or carries a threaded nut, on each opposite end that axially fixes the connecting link 131 to the crank arm 142 and the circular guard plate 135. The pin 141 rotates the link on an orbit 141c about the motor output 138a. The connecting link 131 also includes a threaded portion 131b to finely adjust the connecting link length.

The crank arm 142 is driven by a precise position controlled servo mold plate drive motor 138. The motor is mounted vertically in the machine so that the output 138a rotates on a horizontal axis which is the same horizontal axis that the circular guard plate 135 rotates about. The crank arm 142 is attached to the output 138a to rotate the crank arm about the output 138a. The motor 138 is mounted to a motor support plate 138b that is mounted to and supported by the machine base 21. As shown in FIG. 7, the motor is mounted with the output 138a perpendicular to the support plate. The motor has power and control cables that are routed through a wiring conduit 138a to connect those wires to power and machine control 23. A precise position controlled servo mold plate drive motor 138d is identical to motor 138 but is mounted on the left side of the machine to drive the drive rod 128 on the left side of the machine as shown in FIG. 7. The mechanical configuration on the left side, regarding the mold plate drive motor and related connection are the same as that described for the right side above.

The machine control 23 has instructions for maintaining the two motors 138, 138d operating in sync so that each of the right and left drive rods have the same longitudinal position along their respective ranges of motion. This is necessary to ensure that both lateral sides of the mold plate are in the same longitudinal position with respect to the other and they operate in a parallel reciprocation. The mold plate is reciprocated by the synchronous output both motors 138 and 138d.

The precise position controlled motors 138, 138d can be a 6-7.5 HP totally enclosed fan cooled servo motor. The servo motor is provided with two modules: a power amplifier that drives the servo motor, and a servo controller that communicates precise position information to the machine controller 23. In one embodiment, motors 138 comprise a motor 138e driving a gearbox or gear reducer 138f by a driveshaft 138g as shown in FIG. 7. The motor may be model 1FK7082-7AF71 manufactured by Siemens AG capable of 3000 RPMs and 124 in/lbs of torque. The gearbox may be an in-line gear box such as, an Alpha TP+050 MP manufactured by Wittenstein, Inc. with a place of business in Bartlett, Ill.

In one embodiment, the controller 23 and the servo motors 138, 138d are configured such that the servo motor rotates in an opposite rotary direction every cycle, i.e., clockwise during one cycle, counterclockwise the next cycle, clockwise the next cycle, etc.

A tie bar 139 is connected between the rods 128 to ensure a parallel reciprocation of the rods 128. As the crank arms 142 rotate in opposite rotational directions, the outward centrifugal force caused by the rotation of the crank arms 142 and the eccentric weight of the attached links 131 cancels, and separation force is taken up by tension in the tie bar 139.

One circular guard plate 135 is fastened on top of each crank arm 142. The pin 141 can act as a shear pin. If the mold plate should strike a hard obstruction, the shear pin can shear by force of the crank arm 142. The guard plate 135 prevents an end of the link 131 from dropping into the path of the crank arm 142.

FIG. 5 illustrates a proximity sensor 144 in communication with the machine control 23. A target 144a is clamped onto output shaft 138a of the motor 138. The proximity sensor 144 communicates to the controller 23 that the crank arm 142 is at a particular rotary position corresponding to the mold plate 32 being at a pre-selected position. Preferably, the proximity sensor 144 can be arranged to signal to the controller that the crank arm 142 is in the most forward position, corresponding to the mold plate 32 being in the knockout position. The signal confirms to the controller that the knockout cups 33 can be safely lowered to discharge patties, without interfering with the mold plate 32.

Figure 9:
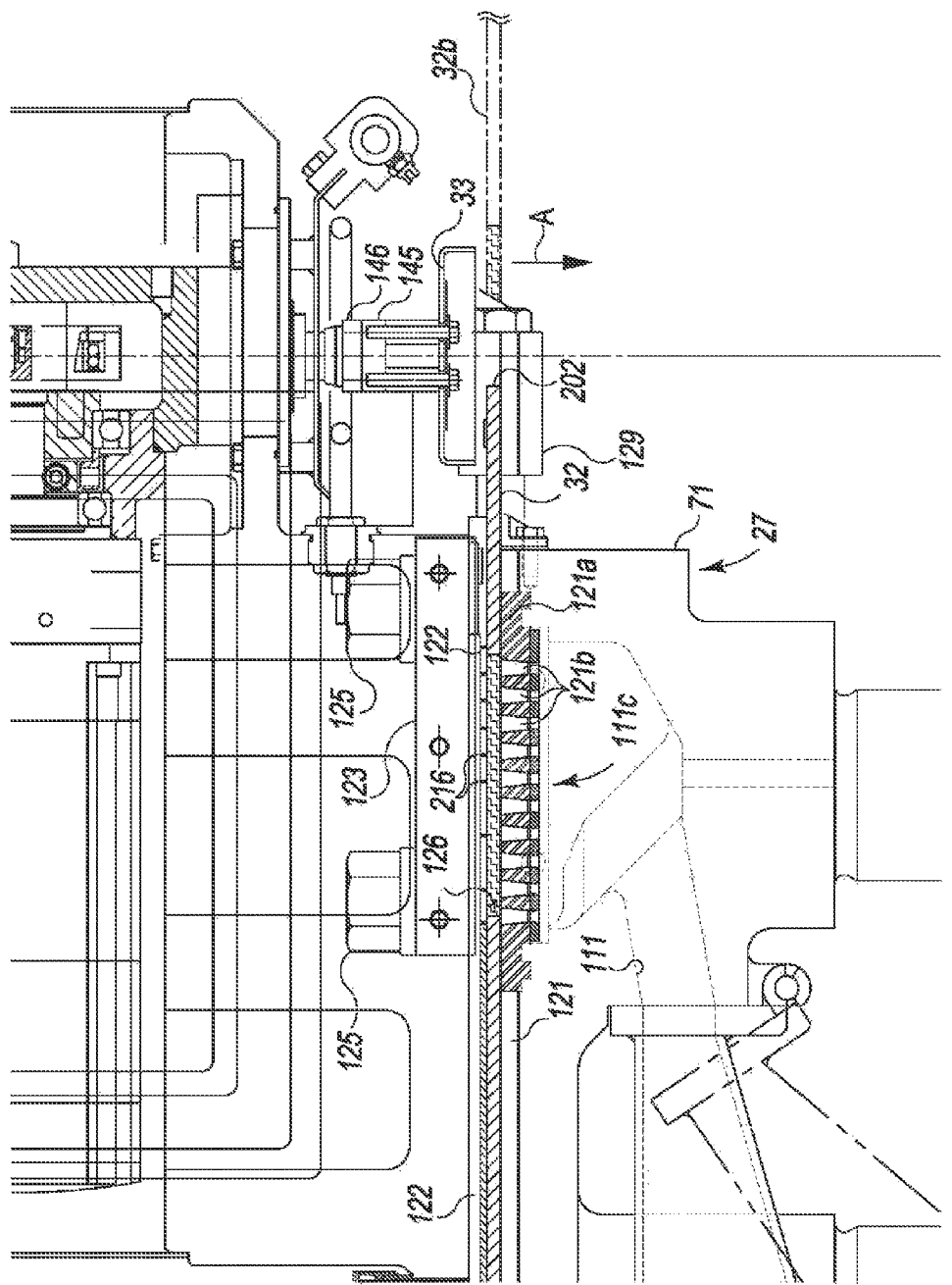
FIG. 9 is a side view of a portion of the molding mechanism.

During a molding operation, the molding mechanism 28 is assembled as shown in FIGS. 2 and 9, with cover plate 122 tightly clamped onto spacers 124.

In each cycle of operation, knockout cups 33 are first withdrawn to the elevated position as shown in FIG. 9. The drive for mold plate 32 then slides the mold plate from the full extended position to the mold filling position with the mold cavities 126 aligned with passageway 111.

During most of each cycle of operation of mold plate 32, the knockout mechanism remains in the elevated position, shown in FIG. 9, with knockout cups 33 clear of mold plate 32. When mold plate 32 reaches its extended discharge position 32b, the knockout cups 33 are driven downward in direction A to discharge the patties from the mold cavities.

The discharged patties may be picked up by the conveyor (not shown) or may be accumulated in a stacker. If desired, the discharged patties may be interleaved with paper, by an appropriate paper interleaving device, and such a device is disclosed in U.S. Pat. No. 3,952,478 or U.S. Pat. No. 7,159,372, both incorporated herein by reference to the extent not inconsistent with the present description. In fact, machine 100 may be used with a wide variety of secondary equipment, including steak folders, bird rollers, and other such equipment.

By using a servo motor to drive the mold plate, the mold plate motion can be precisely controlled. The motion can have a fully programmable dwell, fill time, and advance and retract speeds as controlled by the machine control 23.

Knockout Mechanism

Molding mechanism 28 further comprises a knockout mechanism or apparatus 140 shown in FIGS. 2, 9-12. In one embodiment, the knockout mechanism may be that which is disclosed in U.S. Pat. No. 7,255,554, which is incorporated by reference to the extent not inconsistent with the description provided here. The knockout apparatus comprises the knockout plungers or cups 33, which are fixed to a carrier bar 145. Knockout cups 33 are coordinated in number and size to the mold cavities 126 in the mold plate 32. One knockout cup 33 is aligned with each mold cavity 126. The mold cavity size is somewhat greater than the size of an individual knockout cup. The knockout apparatus 140 is configured to drive the carrier bar 145 in timed vertical reciprocation.

Figure 10:
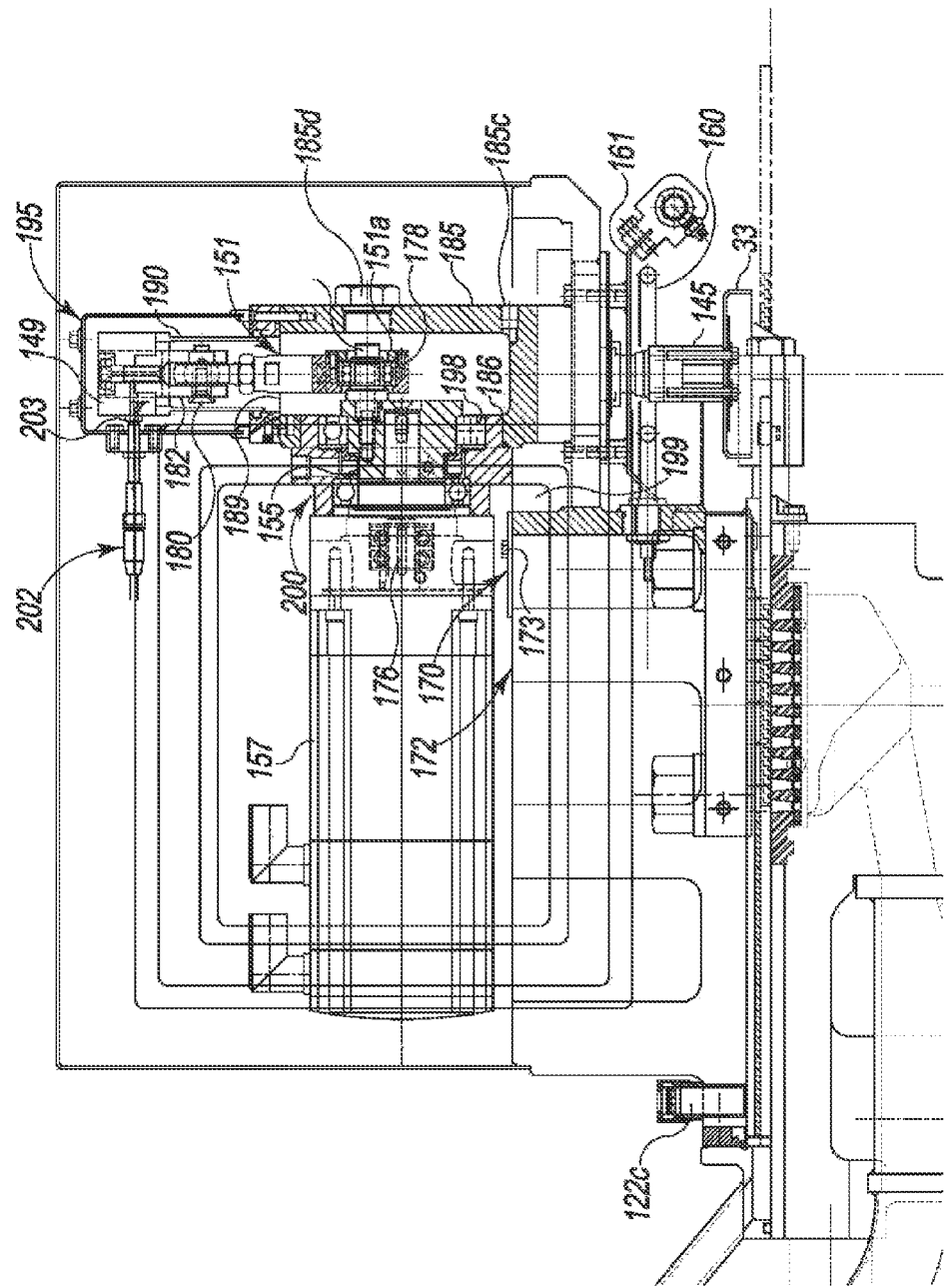
FIG. 10 is a side view of a portion of the molding mechanism.
Figure 11:
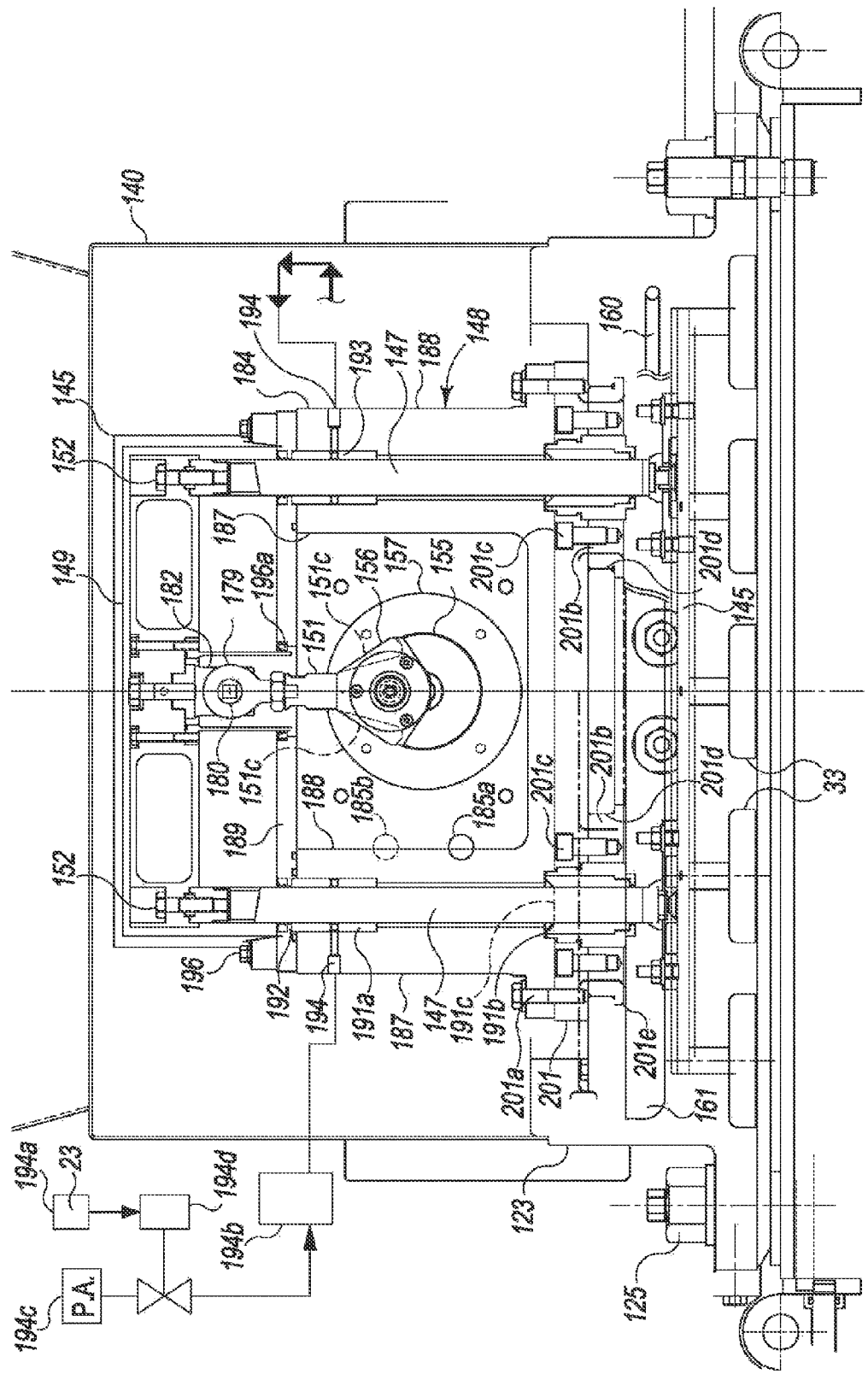
FIG. 11 is a front view of a knockout mechanism.
Figure 12:
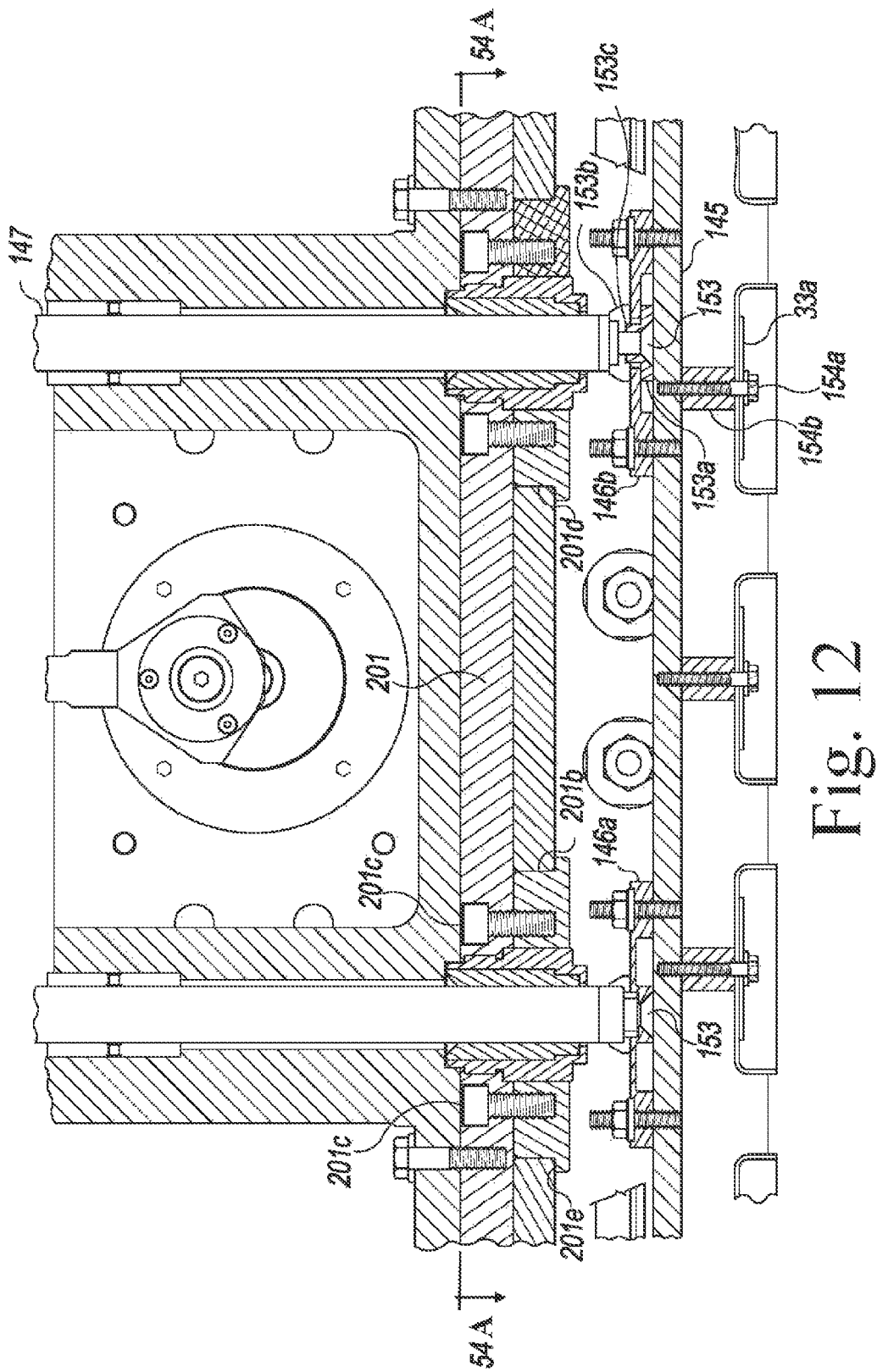
FIG. 12 is a front view of a portion of the knockout mechanism.
Figure 13:
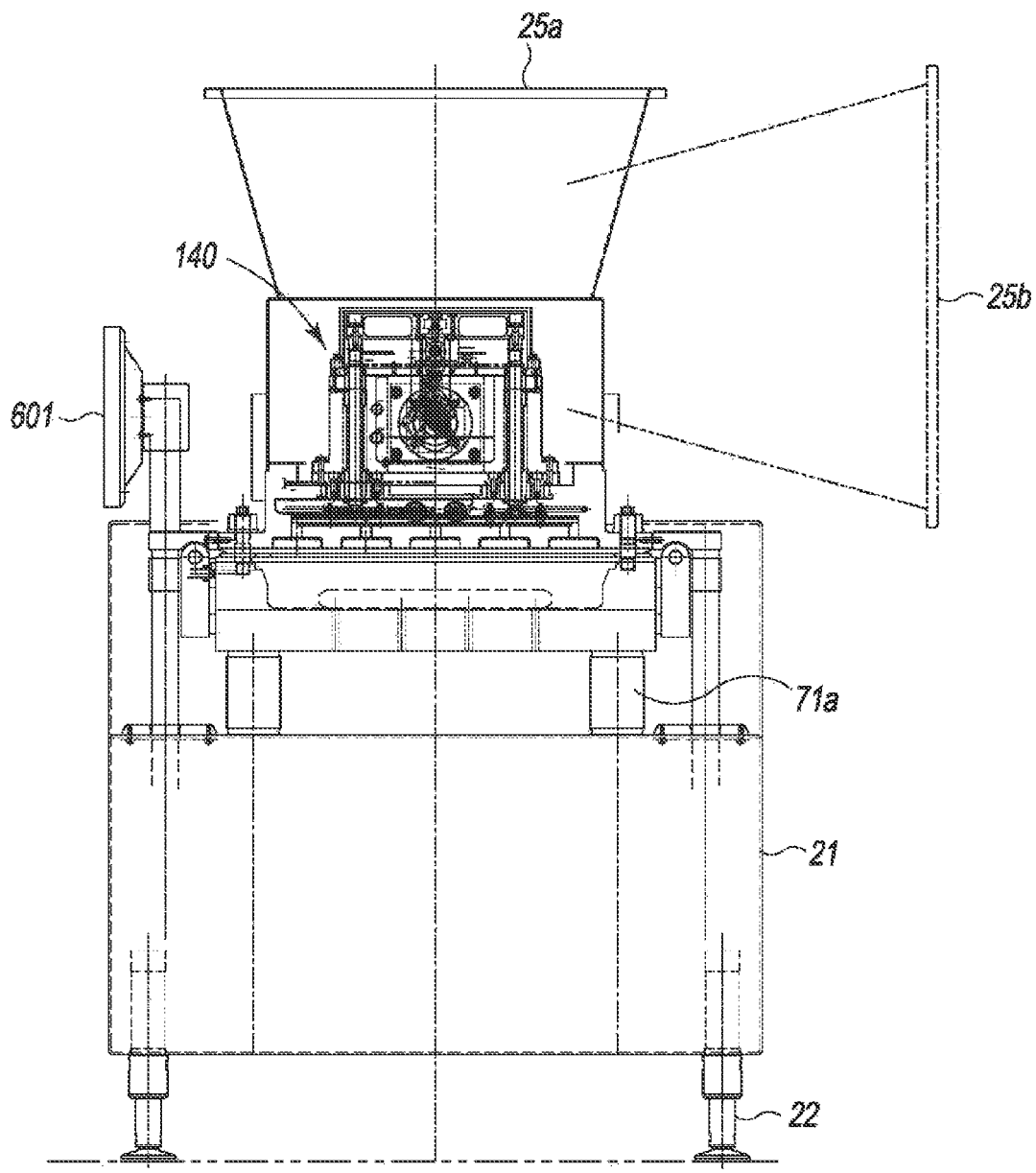
FIG. 13 is a font view of the forming machine of FIG. 1.

FIGS. 10-12 illustrate the knockout apparatus 140 in more detail. The carrier bar 145 is fastened to knockout support brackets 146a, 146b. The knockout support brackets 146a, 146b are carried by two knockout rods 147. Each knockout rod 147 is disposed within a wall of a knockout housing 148 and is connected to a knockout beam 149. The knockout beam 149 is pivotally mounted to a crank rod 151 that is pivotally connected to a fastener pin 156 that is eccentrically connected to a crank hub 155 that is driven by a knock out cup drive motor 157. The knock out drive motor is located above the mold plate.

The motor 157 is preferably a precise position controlled motor, such as a servo motor. An exemplary servomotor for this application is a 3000 RPM, 2.6 kW servo motor provided with a brake, such as a permanent-magnet synchronous servo motor made by Siemens AG having a model number of 1FK7064-7AF71-1GB0. The servo motor is provided with two modules: a power amplifier that drives the servo motor, and a servo controller that communicates precise position information to the machine controller 23.

The controller 23 and the motor 157 are preferably configured such that the motor rotates in an opposite direction every cycle, i.e., clockwise during one cycle, counterclockwise the next cycle, clockwise the next cycle, etc.

A heating element 160 surrounds, and is slightly elevated from the knockout carrier bar 145. A reflector 161 is mounted above the heating element 160. The heating element heats the knock out cups to a pre-selected temperature, which assists in preventing food product from sticking to the knock out cups. The heating element 160 can be configured as disclosed in U.S. Ser. No. 13/187,426 filed on Jul. 20, 2011, and herein incorporated by reference to the extent not inconsistent with the present disclosure.

In FIGS. 10 and 11, the crank hub 155 is rotated into a position wherein the crank rod 151 is vertically oriented and the knockout beam 149 is lifted to its maximum elevation. The knockout rods are fastened to the knockout beam 149 by fasteners 152. The knockout support brackets 146a, 146b are in turn fastened to the knockout rods 147 by fasteners 153. Each knockout cup 33 is fastened to the knockout carrier bar by a pair of fasteners 154a and spacers 154b. An air flap or air check valve 33a can be provided within each cup to assist in dispensing of a meat patty from the cup 33.

As shown in FIG. 10, the motor 157 is supported by a bracket 170 from a frame member 172 that is mounted to the casting 123. The bracket 170 includes one or more slotted holes, elongated in the longitudinal direction (not shown). One or more fasteners 173 penetrate each slotted hole and adjustably fix the motor 157 to the frame member. The motor 157 includes an output shaft 176 that is keyed to a base end of the crank hub 155. The fastener pin 156 retains a roller bearing 178 thereon to provide a low friction rotary connection between an annular base end 151a of the crank rod 151 and the pin 156.

The crank rod 151 has an apertured end portion 179 on an upper distal end 151b opposite the base end 151a. The apertured end portion 179 is held by a fastener pin assembly 180 through its aperture to a yoke 182. The yoke 182 is fastened to the knockout beam 149 using fasteners. The fastener pin assembly 180 can include a roller or sleeve bearing (not shown) in like fashion as that used with the fastener pin 156 to provide a reduced friction pivot connection.

The housing 148 is a substantially sealed housing that provides an oil bath. Preferably, the housing walls and floor is formed as a cast aluminum part. The crank hub 155, the pin 156, roller bearing 178, the apertured end portion 179, the fastener pin 180 and the yoke 182 are all contained within the oil bath having an oil level 183. The limits of the oil bath are defined by a housing 184 having a front wall 185, a rear wall 186, side walls 187, 188, a top wall 189 and a sleeve 190. The sleeve 190 is a square tube that surrounds a substantial portion of the crank rod 151 and is sealed around its perimeter to the top wall 189 by a seal element 196a. The sleeve 190 is connected to the beam 149 and penetrates below the top wall 189. As the yoke 182 reciprocates vertically, the beam 149 and the sleeve 190 reciprocate vertically, the sleeve 190 maintaining a sealed integrity of the oil bath.

The crank rod 151 includes side dished areas 151c that act to scoop and propel oil upward during rotation of the hub 155 to lubricate the pin 180 and surrounding areas.

The knockout rods 147 are guided to reciprocate through the side walls 187, 188, particularly, through upper and lower bearings 191a, 191b. The rods 147 are sealed to the top wall by seals 192. The bearings 191a can include an internal groove 193 that is in flow-communication with a lubricant supply through port 194.

A lubricant system 194a is provided to provide lubricant to the bearings 191a, 191b. The system 194a includes a lubricant reservoir 194b that is filled with lubricant, such as oil, and connected to plant air 194c via an electronically controlled valve 194d. The machine controller 23 periodically, according to a preset routine, actuates the valve 194d to propel some lubricant into the bearings 191a. Lubricant can run down the knockout rod 147 into a dished top 191c of the lower bearings 191b to allow oil to penetrate between the knockout rods 147 and the lower bearings 191b.

An outer cover 195 is fastened and sealed around the side walls 187, 188 and front and rear walls 185, 186 by fasteners, spacers 196 and a seal 197. Any lubricating oil that passes through the seal can be returned to the oil bath via dished out drain areas and drain ports through the top wall.

The front wall 185 includes an oil level sight glass 185a, a fill port 185b (shown dashed in FIG. 11), a drain port 185c (FIG. 10); and an access hole closed by a screw 185d (FIG. 10).

The crank hub 155 is journaled for rotation by two roller bearings 198, 199. The roller bearings 198, 199 are supported by a collar assembly 200 bolted to the rear wall 186 and to the motor 157.

The knockout assembly is changeable to extend further forwardly to minimize knockout cup cantilever. This is accomplished by loosening the bracket 170 from the frame member 172 and sliding the motor and all the connected parts forward or rearward and replacing circular adapter plates for the knockout rods 147.

The housing 148 is fastened to a support plate 201 by fasteners 201a. The support plate 201 is fastened to circular adapter plates 201b by fasteners 201c. The circular adapter plates 201b are removably fit into circular holes 201d in the casting 123. The circular adapter plates 201b include a bottom flange 201e which abuts the casting 123. The circular adapter plates 201b surround the bearings 191b and associated bearing assemblies 191c.

As shown in FIG. 12, the left bracket 146a is fixedly connected to the left knockout rod 147 using the fastener 153 while the right bracket 146b is connected for a sliding connection. In this regard the right fastener 153 passes through an inverted T-nut 153a that passes through the bracket 146b and fits into a back up washer 153b that abuts the top side of the bracket 146b. The bracket 146b includes an oversized opening in the lateral direction that allows the bracket 146b to shift laterally with respect to the T-nut and knockout rod 147. This arrangement allows the bar 145 to expand and contract laterally with respect to the knockout rods 147. When the knockout cups 33 are heated by the heating element 160, the carrier bar 145 can become heated as well. Preferably, the carrier bar 145 is composed of aluminum which can expand to a significant degree. The sliding connection of the bracket 146b accommodates this thermal expansion.

The knockout assembly is changeable to extend further forwardly to minimize knockout cup cantilever and stress in supporting members. This is accomplished by loosening the bracket 170 from the frame member 172 and sliding the motor 157 and the connected parts forward or rearward and replacing the circular adapter plates that guide the knockout rods 147.

As demonstrated in FIG. 13A, to change the longitudinal position of the knockout cups 33, the support plate 201 is shifted longitudinally. Replacement circular adapter plates 201bb are fit into the casting 123 from below. The replacement circular adapter plates 201bb include different hole patterns for the knockout rods 147, forwardly or rearward shifted, to accommodate the new position of the support plate 201.

A proximity sensor 202 is bolted to the outer cover 195, and a target 203 is provided on the crank beam 149 to be sensed by the proximity sensor 202. The proximity sensor 202 communicates to the controller 23 that the knockout cups are raised and the mold plate can be retracted without interfering with the knockout cups.

The movement of the knockout cups is fully programmable for different motion profiles, including dwell, accelerations and extend and retract speeds. Such motion profiles may be useful depending on the properties of the food product to be discharged from the mold plate cavities. Because both the mold plate and the knockout cups can be driven by programmable, controlled servo motors, they can be flexibly sequenced without being restricted in motion by a common mechanical system.

The hopper tilt system and the control panel 23 are configured such that apparatus can be easily factory converted from a right side operating apparatus to a left side operating apparatus, that is, factory reversible across the longitudinal centerline of the apparatus.

The operation of the machine is controlled by the machine control 23. The machine control is schematically shown in FIG. 1. The machine control is signal connected to the rotary pump motor 350, the feed screw drive motors 406, 408, the mold plate drive motors 138, 138d, sensor 144, and the knock out cup drive motor 157. These connections allow the machine to control the operation of the various components of the machine. The connections allow the machine control to know the operating status of each component. The machine control has computer readable instructions for carrying out the functions and operations of the various parts of the machine as described above and for receiving and recording data about the same.

The machine control 23 can be implemented as a programmed general purpose computer, or a single special purpose integrated circuit (e.g., ASIC) having a main or central processor section for overall, machine control, and separate sections dedicated to performing various different specific computations, functions and other processes under control of the central processor section. The machine control 23 can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described or carrying out functions described herein can be used as the machine control 23.

From the foregoing, it will be observed that numerous variations and modifications may be effected without departing from the spirit and scope of the invention. It is to be understood that no limitation with respect to the specific apparatus illustrated herein is intended or should be inferred.

What is claimed is:

1. A food product forming machine comprising:
a food supply;
a rotary food pump in communication with the food supply and including a food pump inlet and a food pump outlet;
a molding mechanism having a mold plate with a mold cavity, the mold plate being reciprocated by a mold plate drive between a cavity fill position and a cavity discharge position, wherein the food pump inlet is located above the mold plate and the food pump outlet is located below the mold plate;
a knockout drive for reciprocating a knockout plunger to discharge molded food products from the mold cavity in the mold plate; and
a manifold connected to an outlet of the rotary food pump and having an outlet passageway connected to an inlet of the molding mechanism for filling the mold cavity of the mold plate.

2. The food product forming machine of claim 1, wherein the rotary food pump is a positive displacement pump.

3. The food product forming machine of claim 1, wherein the rotary food pump includes two rotors configured to create a vacuum between the food pump inlet and the food pump outlet when driven to rotate for drawing food product to the food pump outlet.

4. The food product forming machine of claim 1, wherein the rotary food pump includes two rotors, and wherein each rotor includes at least two wings and each rotor includes an area of rotation that overlaps with the other rotor.

5. The food product forming machine of claim 4, wherein the rotary food pump includes a drive shaft and a driven shaft, wherein the drive shaft includes a drive gear at a first end and one of the rotors at a second end, and wherein the driven shaft includes a driven gear at a first end and the other of the rotors at a second end, and wherein the drive gear and the driven gear are enmeshed to operate the rotors in sync.

6. The food product forming machine of claim 4, wherein each rotor includes open areas between the wings, and wherein one of the wings of one rotor operates in one of the open areas of the other rotor during a portion of an operation cycle.

7. The food product forming machine of claim 4, wherein the rotary food pump further comprises a drive shaft, and wherein a servo-motor is coupled to the drive shaft.

8. A food product forming machine comprising:
- a hopper including a hopper outlet, wherein the hopper outlet includes a narrowing section;
- a rotary food pump in communication with the narrowing section of the hopper outlet, wherein the narrowing section narrows toward the rotary food pump;
- a molding mechanism including a mold plate with a mold cavity;
- a mold plate drive configured to reciprocate the mold plate between a cavity fill position and a cavity discharge position;
- a knockout plunger;
- a knockout drive configured to reciprocate the knockout plunger to discharge molded food product from the mold cavity in the mold plate; and
- a manifold in communication with an outlet of the rotary food pump and including an outlet passageway in communication with an inlet of the molding mechanism for filling the mold cavity of the mold plate;
- wherein the hopper outlet also includes a connecting section, wherein the connecting section is connected to a main hopper body of the hopper and the narrowing section extends from the connecting section away from the main hopper body.

9. The food product forming machine of claim 8, wherein the hopper outlet includes a width and a height, wherein the width is greater than the height.

10. The food product forming machine of claim 8, further comprising a feed screw at least partially positioned in the hopper and including a front portion extending beyond the hopper and enclosed by the hopper outlet.

11. The food product forming machine of claim 8, wherein the hopper outlet is positioned outside of the hopper.

12. The food product forming machine of claim 11, wherein the hopper outlet is positioned at a front of the hopper.

13. The food product forming machine of claim 11, wherein the hopper outlet extends forward of the hopper toward the rotary food pump.

14. The food product forming machine of claim 8, further comprising a pump intake passage including an inlet connected to the narrowing section and an outlet connected to the rotary food pump.

15. The food product forming machine of claim 14, wherein the narrowing section narrows to an outlet flange and the pump intake passage includes a first flange at the inlet of the pump intake passage and a second flange at the outlet of the pump intake passage, wherein the outlet flange of the narrowing section connects to the first flange and the second flange of the pump intake passage connects to the rotary food pump.

16. The food product forming machine of claim 8, wherein the hopper outlet extends from a floor of the hopper upward at a front of the hopper.

* * * * *